US006741185B2

(12) United States Patent
Shi et al.

(10) Patent No.: US 6,741,185 B2
(45) Date of Patent: May 25, 2004

(54) DIGITAL SIGNAL RECEIVER FOR MEASUREMENT WHILE DRILLING SYSTEM HAVING NOISE CANCELLATION

(75) Inventors: Pengyu Shi, Dorchester, MA (US); David Brady, Milton, MA (US); Robert Tennent, Stafford, TX (US); Sandra D. Reyes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 355 days.

(21) Appl. No.: 09/979,393

(22) PCT Filed: May 7, 2001

(86) PCT No.: PCT/US01/40696
§ 371 (c)(1),
(2), (4) Date: Nov. 13, 2001

(87) PCT Pub. No.: WO01/86325
PCT Pub. Date: Nov. 15, 2001

(65) Prior Publication Data
US 2002/0180613 A1 Dec. 5, 2002

Related U.S. Application Data

(63) Continuation of application No. 60/202,435, filed on May 8, 2000.

(51) Int. Cl.[7] .................................................. G01V 3/00
(52) U.S. Cl. .................... 340/853.2; 367/83; 340/854.6; 175/40; 175/48; 375/232; 375/346; 375/347; 375/350
(58) Field of Search ............................. 340/853.2, 856.4, 340/854.6, 855.6, 855.7, 870.05, 870.07; 367/83, 85; 375/232, 346, 347, 350; 175/40, 48

(56) References Cited

U.S. PATENT DOCUMENTS

| 3,302,457 | A | * | 2/1967 | Mayes ........................ 367/83 |
| 3,555,504 | A | * | 1/1971 | Fields ......................... 367/83 |
| 3,716,830 | A | * | 2/1973 | Garcia ......................... 367/83 |
| 3,742,443 | A | * | 6/1973 | Foster et al. .................. 367/83 |
| 3,747,059 | A | * | 7/1973 | Garcia ......................... 367/83 |
| 4,215,425 | A | * | 7/1980 | Waggener .................... 367/83 |
| 4,262,343 | A | * | 4/1981 | Claycomb .................... 367/83 |
| 4,590,593 | A | * | 5/1986 | Rodney ....................... 367/83 |
| 4,642,800 | A | * | 2/1987 | Umeda ........................ 367/85 |
| 4,669,091 | A | * | 5/1987 | Nossen ....................... 375/232 |
| 4,692,911 | A | * | 9/1987 | Scherbatskoy ............... 367/83 |
| 4,715,022 | A | * | 12/1987 | Yeo ............................. 367/83 |
| 4,730,281 | A | * | 3/1988 | Rodney et al. ............... 367/44 |
| 4,866,680 | A | * | 9/1989 | Scherbatskoy ............... 367/83 |
| 4,878,206 | A | * | 10/1989 | Grosso et al. ................ 367/83 |
| 4,980,682 | A | * | 12/1990 | Klein et al. ............... 340/854.6 |
| 5,146,433 | A | * | 9/1992 | Kosmala et al. .............. 367/83 |
| 5,229,765 | A | * | 7/1993 | Gardner ................... 340/853.2 |
| 5,490,121 | A | * | 2/1996 | Gardner et al. ............... 367/83 |
| 5,969,638 | A | * | 10/1999 | Chin ........................ 340/855.3 |

\* cited by examiner

Primary Examiner—Albert K. Wong
(74) Attorney, Agent, or Firm—Brigitte L. Jeffery; Jennie (JL) Salazar; John J. Ryberg

(57) ABSTRACT

A method is disclosed for reducing noise in a measured telemetry signal. The method includes tracking a characteristic of at least one harmonic of a noise component in the measured telemetry signal band. The at least one harmonic has a frequency outside a telemetry signal band. The characteristic of the noise component is determined for at least one other harmonic thereof. The at least one other harmonic has a frequency inside the telemetry signal band. A noise reference is generated from the characteristic of the in band harmonic, and the noise reference is combined with the measured telemetry signal to generate a noise-canceled telemetry signal.

44 Claims, 8 Drawing Sheets

DIGITAL SIGNAL RECEIVER FOR MEASUREMENT WHILE DRILLING SYSTEM HAVING NOISE CANCELLATION

This application is a 371 of PCT/US01/40696 filed May 7, 2001 which claims the benefit of U.S. patent application Ser. No. 60/202,435 filed May 6, 2000.

TECHNICAL FIELD

The invention relates generally to data telemetry methods and apparatus used with measurement-while-drilling (MWD) and logging-while-drilling (LWD) systems. More particularly, the invention relates to a method and apparatus for reducing the effects of harmonically-related tone noise, especially noise from mud pumps, that is intended to improve signal detection in the telemetry used with MWD and LWD systems.

BACKGROUND ART

MWD and LWD systems provide drilling operators greater control over the construction of a well by providing information about conditions at the bottom of a wellbore substantially in real time as the wellbore is being drilled. Certain information is of interest to drilling operators, which is preferably obtained from the bottom of the wellbore substantially in real time. This information includes directional drilling variables such as inclination and direction (azimuth) of the drill bit, and geological formation data, such as natural gamma ray radiation levels and electrical resistivity of the rock formation. Typically, MWD tools or instruments make the directional and other drilling-related measurements, and LWD tools or instruments make the geological formation measurements. Often MWD and LWD tools are integrated into a single instrument package and are called MWD/LWD tools. In the description which follows, the term "MWD system" will be used collectively to refer to MWD, LWD, and combination MWD/LWD tools or instruments. The term MWD system should also be understood to encompass equipment and techniques for data transmission from within the well to the earth's surface.

MWD systems measure parameters (such as the previously mentioned examples) within the wellbore, and can transmit the acquired data to the earth's surface from within the wellbore. There are several different methods for transmitting data to the surface, including "mud pulse" telemetry and electromagnetic telemetry.

In mud-pulse telemetry, data is transmitted from the MWD system in the wellbore to the surface by means of generating pressure waves in the drilling fluid (drilling "mud") that is pumped through the drill string by pumps on the surface. FIG. 1 illustrates a drilling system 100 that is equipped for MWD system operation using mud-pulse telemetry. As shown in FIG. 1, the drilling system 100 includes a drill string 112 hanging from a derrick 150. The drill string 112 extends through a rotary table 152 on the rig floor 151 into the wellbore 121. A drill bit 111 is attached to the end of the drill string 112. Drilling is accomplished by rotating the drill bit 111 while some of the weight of the drill string 112 is applied to the bit. The drill bit 111 may be rotated by rotating the entire drill sting 112 from the surface using the rotary table 152 which is adapted to drive a kelly 153, or alternatively by using a top drive (not shown). Alternatively, operating a positive displacement motor known as a "mud motor" 110 disposed in the drill string 112 above the drill bit 111, drilling can be accomplished without rotating the entire drill string 112.

While drilling, drilling mud is pumped by mud pumps 115 on the surface through surface piping 117, standpipe 118, rotary hose 119 and swivel 154, kelly 153 and down the drill string 112. Pulsation dampeners 116, also known as desurgers or accumulators, are located near the outputs of the mud pumps 115 to smooth pressure transients in the mud discharged from the mud pumps 115. The mud in the drill string 112 is forced out through jet nozzles (not shown) in the cutting face of the drill bit 111. The mud is returned to the surface through an annular space (the well annulus 113) between the well 121 and the drill string 112. One or more sensors or transducers 101 are located in a measurement module 102 in a bottomhole assembly portion of the drill string 112 to measure selected downhole conditions. For example, the transducer 101 may be a strain gage that measures weight-on bit (axial force applied to the bit 111) or a thermocouple that measures temperature at the bottom of the well 121. Additional sensors may be provided as necessary to measure other drilling and formation parameters such as those previously described.

The measurements made by the transducers 101 may be transmitted to the surface through the drilling mud in the drill string 112. To do this, first, the transducers 101 send signals that are representative of the measured downhole condition to a downhole electronics unit 103. The signals from the transducers 101 may be digitized in an analog-to-digital converter (not shown separately). The downhole electronics unit 103 then collects the measurements from the transducers 101 and arranges them into a selected telemetry format, usually a digital representation of the measurements made by the transducers 101. Extra digital bits used for synchronization, and error detection and correction may be added to the telemetry format. The telemetry format is then passed to a modulator 104, which groups bits into symbols and then uses a process called modulation to impress the symbols onto a baseband or carrier waveform that can be transmitted through the mud in the drill string 112. A symbol consists of a group of one or more bits. The modulated signals serve as input to an acoustic "transmitter" 105 and valve mechanism 106 that generates a telemetry pressure wave that ultimately carries data to the surface. One or more pressure transducers 130, 132 located on the standpipe 118, or surface piping 117, generate signals that are representative of variations in the pressure of the mud. The outputs 131, 133 of the pressure transducers 130, 132 can be digitized in analog-to-digital converters and processed by a signal processing module 134, which recovers the symbols from the pressure variations and then sends data recovered from the symbols to a computer 135 where the transmitted information can be accessed by the drilling operators.

There are several mud-pulse telemetry systems known in the art. These include positive-pulse, negative-pulse, and continuous-wave. In a positive-pulse system, valve mechanism 106 of the transmitter 105 creates a pressure pulse at higher pressure than that of the drilling mud by momentarily restricting flow in the drill string 112. In a negative mud-pulse telemetry system, the valve mechanism 106 creates a pressure pulse at lower pressure than that of the mud by venting a small amount of the mud in the drill string 112 through a valve 106 to the well annulus 113. In both the positive-pulse and negative-pulse systems, the pressure pulses propagate to the surface through the drilling mud in the drill string 112 and are detected by the pressure transducers 130, 132. To send a stream of data, a series of pressure pulses are generated in a pattern that is recognizable by the signal processing module 134.

The pressure pulses generated by positive-pulse and negative-pulse systems are discrete pressure waves. Continuous wave telemetry can be generated with a rotary valve or "mud siren." In a continuous-wave system, the valve mechanism 106 rotates so as to repeatedly interrupt the flow of the drilling mud in the drill string 112. This causes a periodic pressure wave to be generated at a rate that is proportional to the rate of interruption. Information is then transmitted by modulating the phase, frequency, or amplitude of the periodic wave in a manner related to the downhole measured data.

The telemetry pressure wave that carries information from the transmitter 105 to the pressure transducers 130, 132 is subjected to attenuation, reflections, and noise as it moves through the drilling mud. The signal attenuation as it passes through the mud channel may not be constant across the range of component frequencies present in the telemetry pressure wave. Typically, lower frequency components are subject to less attenuation than higher frequency components. The pressure waves are also reflected off the bottom of the well, and are at least partially reflected at any acoustic impedance mismatches in the drill string 112 and the surface mud system, i.e., the mud pumps 115, surface piping. 117, standpipe 118, rotary hose 119, swivel 154, and pulsation dampeners 116. As a result, the signal pressure wave arriving at the pressure transducer 130, 132 on the standpipe 118 is the superposition of the main wave from the transmitter 105 and multiple reflected waves. The result of the reflections and frequency dependent attenuation is that each of the transmitted symbols become spread out in time and interfere with symbols preceding and following those transmitted symbols. This is known in the digital communications art as intersymbol interference (ISI).

Pressure waves from the surface mud pumps 115 contribute considerable amounts of noise. The pump noise is mainly the result of reciprocating motion of mud pump pistons and is harmonic in nature. The pressure waves from the mud pumps 115 travel in the opposite direction from the main information carrying wave, namely from the surface down the drill string 112 to the drill bit 111. The pressure transducers 130, 132 detect pressure variations representative of the sum of signal waves and noise waves. Components of the noise from the surface mud pumps 115 may be present within the frequency range used for transmission of the telemetry wave. In some cases the components of the mud pump 115 noise waves may have considerably greater power than the received telemetry wave, making correct detection of the received symbols very difficult. Additional downhole sources of noise can include the drilling motor 110, and drill bit 111 interaction with formation being drilled. All these factors degrade the quality of the received pressure signal and make it difficult to recover the transmitted information.

Mechanical vibration of the rig 150 and electrical noise coupling onto the electrical wiring that carries the electrical signals from the sensors 130, 132 to the signal receiver 134 on the surface may also degrade the reception of the wanted telemetry signal.

Attempts to find solutions for reducing interfering effects in MWD telemetry signals are not new and many techniques have been proposed. Most of these techniques concentrate on reducing the interference from mud pump noise. For example, U.S. Pat. No. 3,302,457 issued to Mayes discloses a scheme for reducing mud pump noise based on combining the outputs of a static pressure sensor and a differential pressure sensor. U.S. Pat. No. 3,555,504 issued to Fields discloses a method using two pressure taps at spaced points on the surface piping. The pressure taps are connected to flow lines which delay the pressure wave from one tap relative to the other so that the pump noise components from both taps would be in phase at a differential pressure meter, thus canceling the pump noise. U.S. Pat. No. 3,488,629 issued to Claycomb discloses an extension to the technique disclosed in the Fields '504 patent, including check valves in the flow lines to reduce reflected waves in the flow lines.

U.S. Pat. No. 3,747,059 issued to Garcia discloses an electronic noise filter system that eliminates spurious detection caused by mud pump noise waves reflecting back off the rotary hose. The electronic noise filter system is coupled to at least two pressure-sensitive transducers located at spaced points on the mud pump side of the flexible hose. Electronic circuits in the electronic noise filter system introduce relative delays as well as amplitude and phase adjustments to the signals detected by the transducers. After the delays and the amplitude and phase adjustments, the mud pump noise components of the signals are aligned in phase and can be subtracted, leaving only the signal from downhole. U.S. Pat. No. 3,716,830 issued to Garcia discloses an alternative system that eliminates spurious detection caused by mud pump noise waves reflecting back off the rotary hose by placing one of the transducers after the rotary hose on the side furthest away from the mud pumps. The systems disclosed in the Garcia '830 patent only reduce the effect of mud pump noise wave reflecting off the rotary hose; other reflections or distortions of the noise or signal waves are not addressed.

U.S. Pat. No. 3,742,443 issued to Foster et al. discloses a noise reduction system that uses two pressure sensors at spaced apart positions. The optimum spacing of the sensors is one-quarter wavelength at the frequency of the telemetry signal carrier. The signal from the sensor closer to the mud pumps is passed through a fitter having characteristics related to the amplitude and phase distortion encountered by the mud pump noise component as it travels between the two spaced points. The filtered signal is delayed and then combined with the signal derived from the sensor further away from the mud pumps. Combining the signals results in destructive interference of the mud pump noise, and constructive interference of the telemetry signal wave, because of the one-quarter wavelength separation between the sensors. The combined output is then passed through another filter to reduce distortion introduced by the signal processing and combining operation. The system does not account for distortion introduced in the telemetry signal wave as it travels through the mud column from the downhole transmitter to the surface sensors. The filter on the combined output also assumes that the mud pump noise wave traveling from the mud pumps between the two sensors encounters the same distortion mechanisms as the telemetry signal wave traveling in the opposite direction between the same pair of sensors. This assumption does not, however, always hold true in actual MWD systems.

U.S. Pat. No. 4,215,425 issued to Waggener discloses a coherent phase shift keying (PSK) demodulation system that includes a differential filtering operation for mud pump noise cancellation using two sensors separated by one-quarter wavelength U.S. Pat. No. 4,262,343 issued to Claycomb discloses a system in which signals from a pressure sensor and a fluid velocity detector are combined to cancel mud pump noise and enhance the signal from downhole. U.S. Pat. No. 4,590,593 issued to Rodney discloses a two sensor noise canceling system similar to those of Garcia and Foster et al., but which includes a variable delay. The delay is determined using a least mean squares algorithm during the absence of downhole data transmission.

U.S. Pat. No. 4,642,800 issued to Umeda discloses a noise-reduction scheme that includes obtaining an "average pump signature" by averaging over a certain number of pump cycles. The assumption is that the telemetry signal is not periodic with the same period as the pump noise and, hence, will average to zero. The pump signature is then subtracted from the incoming signal to leave a residual that should contain mostly telemetry signal. U.S. Pat. No. 5,146,433 issued to Kosmala et al uses signals from position sensors on the mud pumps as inputs to a system that relates the mud pump pressure to the position of the pump pistons. Thus, the mud pump noise signature is predicted from the positions of the pump pistons. The predicted pump noise signature is subtracted from the received signal to cancel the pump noise component of the received signal.

U.S. Pat. No. 4,715,022 issued to Yeo discloses a signal detection method for mud pulse telemetry systems using a pressure transducer on the gas filled side of the pulsation dampener to improve detection of the telemetry wave in the presence of mud pump noise. One of the disclosed embodiments therein includes a second pressure transducer disposed on the surface pipes between the dampener and the drill string, and a signal conditioner to combine the signals from the two transducers.

U.S. Pat. No. 4,692,911 issued to Scherbatskoy discloses a scheme for reducing mud pump noise by subtracting from the received standpipe pressure signal, the signal that was received T seconds previously, where T represents the period of the pump strokes. The received standpipe pressure signal comes from a single transducer. A delay line is used to store the delayed standpipe pressure signal and this is then subtracted from the current standpipe pressure signal. This forms a comb filter with notches at integer multiples of the pump stroke rate. The telemetry signal then needs to be recovered from the output of the subtraction operation, that includes the telemetry signal plus delayed copies of the telemetry signal.

A control signal must be obtained that controls the delay T. The control signal may be obtained from a mechanical sensor, placed on the mud pump, that produces pulses at a rate proportional to the stroke rate of the mud pump. In an alternative embodiment the timing control signal is extracted from the standpipe pressure signal. The timing pulses for determining the delay T are produced by a phase-locked loop that tracks the 512 harmonic of the mud pumps. U.S. Pat. No. 4,866,680 issued to Scherbatskoy discloses an enhancement of the method disclosed in the Scherbatskoy '911 patent, which includes the use of a Wiener filter (effectively a linear equalizer) to reduce the telemetry signal distortion caused by the subtraction operation that is used to reduce the mud pump noise.

U.S. Pat. No. 4,730,281 issued to Rodney discloses an adaptive bucket brigade filter with a feedback loop in place of the delay used by Scherbatskoy to produce a comb filter response that removes a periodic noise and its harmonics while also reducing the delayed copies of the telemetry signal caused by the comb filter response.

U.S. Pat. No. 4,878,206 issued to Grosso et al. discloses an adaptive filtering method for reducing noise caused by the stick and slip effects of the rotary table. The system disclosed in the '206 patent uses measurements of the rotary table torque as a reference input to an adaptive noise canceler. The main signal input to the noise canceler is the measured standpipe pressure. The aim of the noise canceling system disclosed in the Grosso et al. '206 patent is to reduce the effects of variations in the measured standpipe pressure caused by rotary table stick and slip.

U.S. Pat. No. 5,490,121 issued to Gardner et al. discloses a non-linear adaptive equalizer for reducing non-linear distortion of the telemetry signal. The nonlinear equalizer receives an input signal from a pressure transducer and passes the signal through a bank of non-linear function elements. The signal is then processed by a parallel set of linear, or decision feedback, equalizers. One linear equalizer receives the unmodified input signal as its input, and the other linear equalizers receive their inputs from the output of a nonlinear function element. The output signals of the linear equalizers are summed together to provide the nonlinear equalizer's output signal.

U.S. Pat. No. 5,969,638 issued to Chin discloses a signal processor for use with MWD systems. The signal processor combines signals from a plurality of signal receivers on the standpipe, spaced less than one-quarter wavelength apart to reduce mud pump noise and reflections traveling in a downhole direction. The signal processor isolates the derivative of the forward traveling wave, i.e., the wave traveling up the drill string, by taking time and spatial derivatives of the wave equation. Demodulation is then based on the derivative of the forward traveling wave. The signal processor requires that the signal receivers be spaced a distance of five to fifteen percent of a typical wavelength apart.

FIG. 2 shows an example of the previously referred to electromagnetic telemetry system used with MWD systems. The measured data are used to modulate an electromagnetic wave instead of the acoustic wave used in mud pulse telemetry. The communications channel is no longer the mud column within the drill string. Electromagnetic telemetry is often used when drilling using "under-balanced" drilling mud. The drilling mud is aerated in typical under-balanced drilling, so that the downhole mud pressure is approximately the same as that of the formation, thus preventing damage to the formation. An electromagnetic transmitter 201 substitutes for the acoustic transmitter (105 in FIG. 1) in the bottom hole assembly. The transmitter 201 generates an electromagnetic wave by producing a time-varying potential difference across an insulating gap 202. The electromagnetic wave propagates through the earth to the surface. The signal at the surface is measured as the potential difference between two or more spaced apart points 210, 212, 214. For example, the surface signal measurement may consist of the difference in electrical potential between that measured at the wellhead 210 and other electrical conductors 212, 214 in contact with the earth at some distance from the wellhead 210. A sensor at the wellhead measures the electrical potential at that point. The sensor sends a signal 211 representative of this electrical potential to the signal processing module 134. A sensor 212 at a second location measures the electrical potential at that second location A signal 213 representative of the electrical potential measured by this second sensor is also sent to the signal processing module 134. The difference in potential between these two locations is representative of the electromagnetic telemetry signal received at the surface. The signal processing module recovers the transmitted symbols and then the data bits.

High power electrical equipment such as the mud pumps 115 and the rotary table's 154 driving motor can induce electrical currents in the earth near the surface. This electrical noise may also be harmonic in nature and present similar problems to the electromagnetic telemetry as the mud pump noise does for mud pulse telemetry.

DISCLOSURE OF INVENTION

One aspect of the invention is a method for reducing noise in a measured telemetry signal. The method according to this aspect includes tracking a characteristic of at least one harmonic of a noise component in the measured telemetry signal. The at least one harmonic has a frequency outside a telemetry signal band. The characteristic of the noise component is determined for at least one other harmonic thereof. The at least one other harmonic has a frequency inside the telemetry signal band. A noise reference is generated from the characteristic of the in band harmonic, and the noise reference is combined with the measured telemetry signal to generate a noise-canceled telemetry signal.

In some embodiments, the characteristic is the instantaneous frequency of the harmonic. In some embodiments, the characteristic is the instantaneous phase. In some embodiments, the characteristic is tracked for a plurality of harmonics having frequencies outside the telemetry signal band.

In some embodiments, the detected telemetry signal is bandpass filtered within the telemetry signal band, and is filtered outside the telemetry signal band prior to the tracking to enhance the generating the noise reference.

In some embodiments, the combining includes adaptive noise canceling. In some embodiments, the combining includes estimating an amplitude and instantaneous phase and frequency of noise components inside the telemetry signal band from the tracked characteristic, reconstructing the noise components inside the telemetry signal band from the estimated amplitude and instantaneous frequency and phase, and summing the reconstructed noise components with the detected telemetry signal.

Other aspects and advantages of the invention will be apparent from the following description and the appended claims.

BRIEF DESCRIPTION OF DRAWINGS

FIG. 5(*b*) is a schematic of the equalizer/noise cancellation system of FIG. 5(*a*) including a decision feedback section.

FIG. 6(*b*) is a schematic of a quadrature mixer and baseband filtering module as used in a digital receiver.

FIG. 7(*b*) is a schematic of a combined multi-channel equalizer/noise cancellation system.

FIG. 9(*b*) is a frequency domain representation of the spectrum of mud pump noise produced by two triplex mud pumps running at slightly different stroke rates.

DETAILED DESCRIPTION

Figure 1:
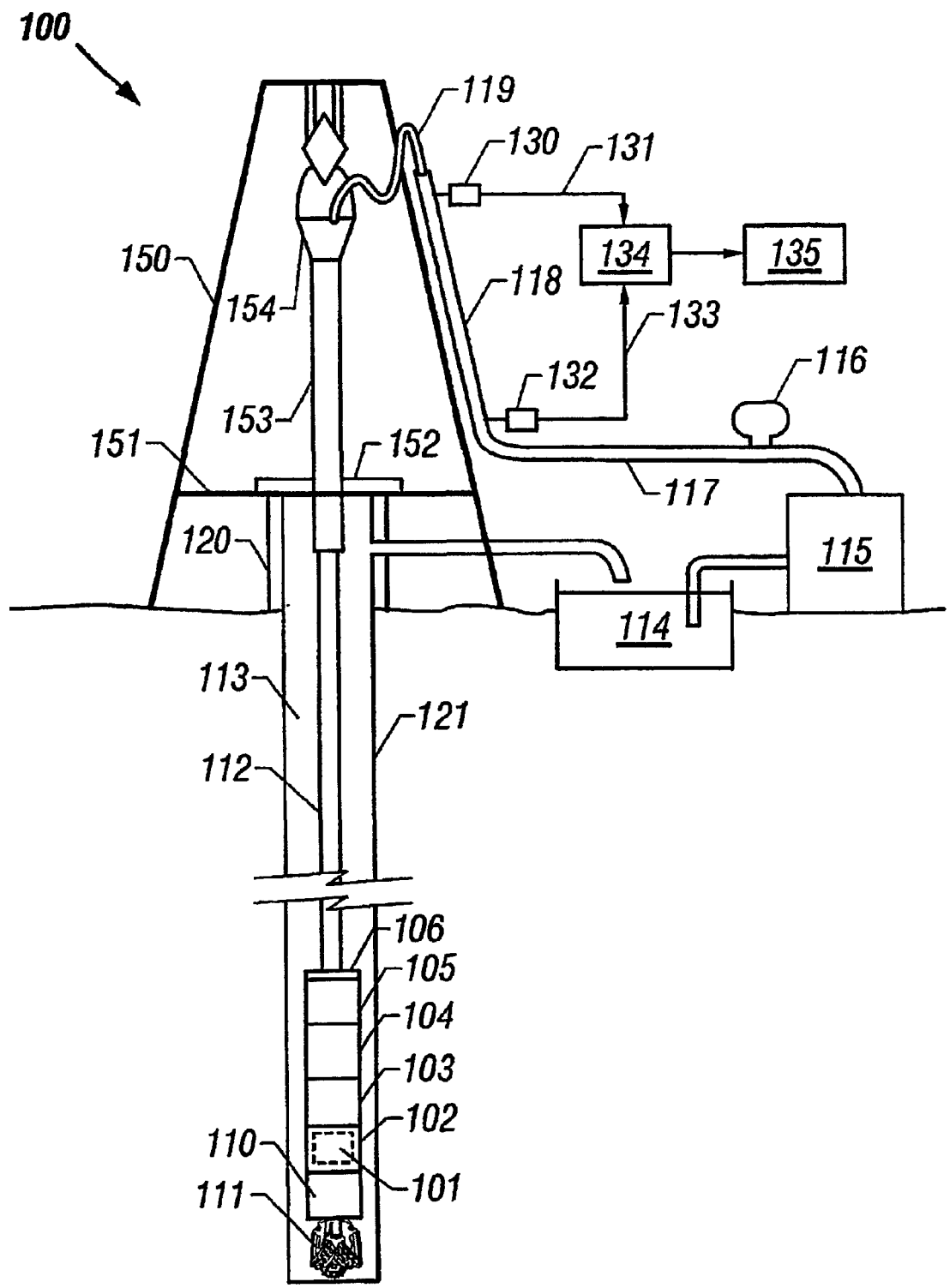
FIG. 1 illustrates one example of a drilling system including an MWD system having mud pulse telemetry.
Figure 2:
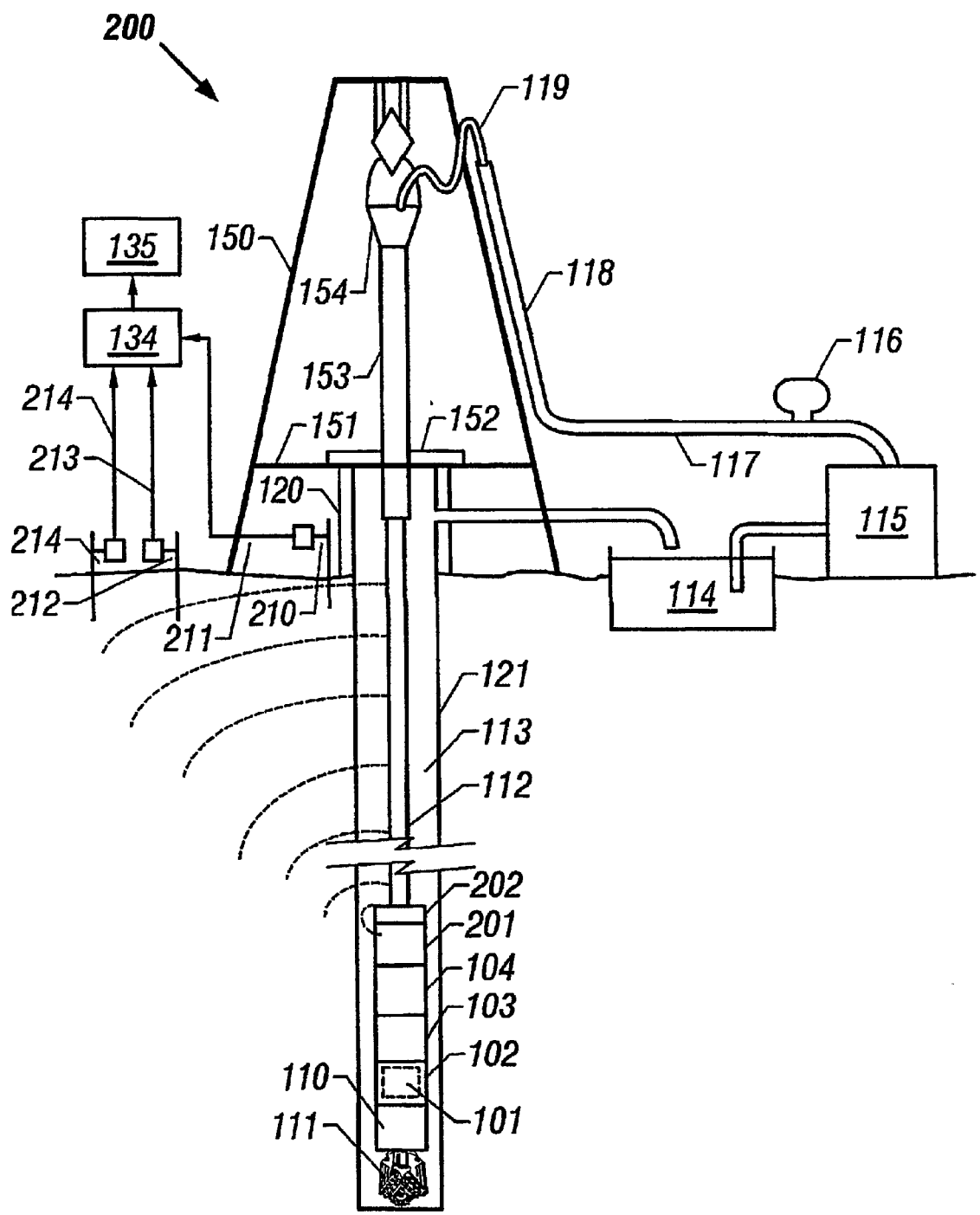
FIG. 2 illustrates one example of a drilling system including an MWD system having electromagnetic telemetry

One example of a drilling system including an MWD system, such as illustrated in FIG. 1, includes a mud-pulse telemetry system. The mud-pulse telemetry system, as previously explained, includes a measurement module 102 (including therein one or more transducers or sensors), an electronics unit 103, a modulator 104, a transmitter 105, a mud (telemetry) channel, sensors 130, 132, a signal processing module 134, and a computer 135. The measurement module 102, electronics unit 103, modulator 104, and transmitter 105 correspond to the downhole portion of the telemetry system, and the sensors 130, 132, receiver 134 and computer 135 correspond to the surface portion of the telemetry system. The mud channel consists of an acoustic path in the drilling mud inside the drill string 112, kelly 153, swivel 154, rotary hose 119, standpipe 118, surface piping 117, pulsation dampeners 116 and mud pumps 115. The mud channel operatively connects the downhole portion of the telemetry system to the surface portion of the telemetry system. The measurement module 102 generates messages that can be transmitted to the computer 135. These messages include information that is of interest to the drilling operators, e.g., directional and drilling data and geological formation data. The measurement module 102 includes one or more transducers (or sensors) 101 which measure selected parameters, such as drilling and/or earth formation petrophysical parameters and generate electrical signals related to the parameters measured The measurements made by the transducers 101 in the measurement module 102 may be digitized by passing them through analog-to-digital converters (not shown). A group of of binary digits, or bits, thus generated, representing the measurements (hereafter referred to as measurement words) are transferred to the electronics unit 103. In the electronics unit 103, extra bits may be added to the measurement words. The extra bits can be used for error detection and correction or for identification of the measurement words. The measurement words may also be filtered or compressed to improve bandwidth efficiency. The electronics module 103 may group the measurement words into data frames. Extra bits for frame synchronization, channel identification, equalizer training, or error detection and correction may be included in the data frames. The format of the telemetry actually used in any embodiment of the invention is a matter of choice for the system designer and is not intended to limit the invention.

The output of the electronics unit 103 is a bit stream that is the input to the modulator 104. The modulator 104 groups the bits from the output of the electronics unit 103 into symbols and then impresses these symbols onto a waveform that is suitable for propagation over the mud channel. The size of a symbol may be one or more bits. The output of the modulator 104 is transferred to the transmitter 105, which produces the pressure pulses or waves that propagate through the mud channel. The telemetry waveform may be a baseband waveform. In this example, symbols are transmitted using a technique called line coding. Examples of line codes that can be used to impress the information on to the baseband waveform include non-return-to-zero (NRZ), Manchester code, Miller code, time analog, and pulse position modulation. Line codes for mud pulse telemetry are known in the art. See for example, S. P. Monroe, *Applying Digital Data-Encoding Techniques to Mud Pulse Telemetry*, paper no. 20326, Proceedings of the Petroleum Computer Conference, Denver, Jun. 25–28, 1990, pp. 7–16, Society Of Petroleum Engineers, Richardson, Tex.

Instead of using line coding, the modulator 104 and the transmitter 105 may alternatively impress the symbols onto a suitable carrier by varying the amplitude, phase, or frequency of a carrier, usually a sinusoidal signal, in accordance with the value of a single bit, or group of bits, making up a symbol. This process is called modulation. For example, in binary phase shift keying (BPSK) modulation, the phase of a constant amplitude carrier signal is switched between two values according to the two possible values of a binary digit, corresponding to binary 1 and 0, respectively. Examples of other modulation types include amplitude modulation (AM), frequency modulation (FM), minimum shift keying (MSK), frequency shift keying (FSK), phase shift keying (PSK), phase modulation PM), continuous phase modulation (CPM), quadrature amplitude modulation (QAM), and trellis code modulation (TCM). These modulation types and the aforementioned line codes are known in the art. See, for example, John G. Proakis, *Digital Communications*, 3rd edition, McGraw-Hill, Inc. (1995), and Theodore S. Rappaport, *Wireless Communications*, pp. 197–294, Prentice Hall, Inc. (1996).

The transmitter 105 uses the telemetry waveform signal generated by the modulator 104 to control the valve mechanism 106, which alters the flow of mud in the drill string 112 to generate a pressure wave. In one embodiment, the mechanism 106 is a rotary valve or "mud siren" that generates periodic waveforms in fluid. An example of a mud siren is disclosed in U.S. Pat. No. 5,375,098 issued to Malone et al., assigned to the assignee of the present invention. The valve mechanism 106 does not have to be a mud siren, but may alternatively be a type that generates positive pressure pulses or negative pressure pulses. Such valves can be of any of any type well known in the art The signal wave generated by the transmitter 105 and valve mechanism 106 propagates to the receiver 134 through the mud channel. The mud pumps 115 provide the flow of mud that passes from the mud tanks 114, through the surface piping 117, standpipe 118, rotary hose 119, swivel 154, kelly 153, drill sting 112, out through nozzles in the drill bit 111 to return to the surface via the annulus 113. At the surface the mud is returned to the mud tanks 114, where rock cuttings are also removed from the mud.

The pumping action of the mud pumps 115 is generally periodic and therefore produces a constant flow component with periodic components superimposed thereon. The periodic components of the mud flow can be expressed by an equation having the form:

$$N(t) = \sum_{i=1}^{P} \sum_{k=1}^{\infty} a_{ik} \cos(k 2\pi f_i t + \phi_{ik}) \quad (1)$$

where P represents the number of mud pumps, $f_i$ represents the fundamental frequency ($1^{st}$ harmonic) of the $i^{th}$ pump, k represents the harmonic number, and $\phi_{ik}$ represents the initial phase of the $k^{th}$ harmonic from the $i^{th}$ pump, $a_{ik}$ represents the amplitude of the $k^{th}$ harmonic from the $i^{th}$ pump. Thus the mud pump noise may be characterized as a set of "tones" with each tone occurring at an integer multiple of a mud pump's fundamental frequency. The pulsation dampeners 116 on the outlet side of the mud pumps 115 help to smooth fluctuations in the mud pump pressure and flow, but the noise from the mud pumps 115 is often considerably stronger than the MWD telemetry signal arriving at the earth's surface. The fundamental frequency of the periodic component of the output of each mud pump may be time-varying. The amplitudes of some of the harmonic tones may be considerably larger than others, depending on the type of pump. For example, a "triplex" (three cylinder) pump will have the majority of its noise present at multiples of the third harmonic of that pump. Thus the third, sixth, ninth, twelfth harmonics etc. are predominant for a triplex pump. In most cases, the third and sixth harmonics are the largest. Similarly, for a "duplex" (two cylinder) pump, the second, fourth, sixth, etc. harmonics will be predominant.

One or more transducers (or sensors) such as transducers 130, 132, disposed at the earth's surface, measure at least one parameter related to the mud waves. The sensors 130, 132 generate electrical signals 131, 133 that are representative of these parameters. In one example embodiment, the transducers 130, 131 measure mud pressure and/or changes in mud pressure. The measured pressure is to a great extent the sum of a telemetry signal component and a mud pump noise component. Other types of measurements, for example, mud flow rate measurements, may also be used in other embodiments of the invention. The output 131 of transducer 130 may be digitized in an analog-to-digital converter for subsequent processing by a digital signal processor 134 or other digital computer. Similar processing may be applied to the output 133 of transducer 132.

The telemetry signal occupies a relatively narrow range of frequencies, while the mud pump noise components are spread over a much wider range of frequencies. Some of the mud pump noise components will fall within the range of frequencies used for transmitting the telemetry signal (hereafter referred to as the telemetry signal band). The chances of correctly detecting the telemetry signal would be improved if the mud pump noise components were reduced in magnitude or removed from the combined signal and noise components as measured by the transducers 130, 132. Various embodiments of the invention provide ways to substantially cancel the mud pump noise component in the signals 131, 133 generated by the transducers 130, 132.

The operating ("stroke") rate of the mud pumps, and therefore the frequency of the mud pump noise (and harmonics), is not constant over time. In order to substantially reduce the mud pump noise component of the received telemetry signal it is desirable to track these changes in the mud pump noise characteristics. In certain embodiments of the invention, the mud pump noise components which fall within the telemetry signal band can be estimated from characteristics of the mud pump noise harmonic multiple frequencies which fall outside the telemetry signal band. The ratio of the power in some of the mud pump noise harmonics that fall outside of the telemetry signal band (particularly the "dominant" harmonics) with respect to the background noise level can be very high. In some cases the ratio of the power in the mud pump noise to the background noise power can be several orders of magnitude. Therefore, by tracking these large power mud pump harmonics, it is possible to obtain very good estimates of the characteristics of these noise tones. The harmonic relationship between the mud pump noise tones may then be used to determine the characteristics of the mud pump harmonic noise tones that are present within the telemetry signal band. Once good estimates of the characteristics of the harmonic noise tones within the telemetry signal band are determined, it is possible to substantially cancel, or at least considerably reduce, the effects of the mud pump noise on the detected telemetry signal.

One characteristic of the mud pump noise that can be tracked is the instantaneous frequency of a harmonic multiple of the pump noise. Several methods for tracking the instantaneous angular frequency of sinusoids, or complex-valued cisoids, in noise are known in the art. Many of these frequency tracking methods are based on adaptive notch filter structures or on multiple frequency trackers. Examples of frequency tracking methods are described in the following references: Bor-Sen Chen, Tsang-Yi Yang and Bin-Hong Lin, *Adaptive notch filter by direct frequency estimation*, Signal Processing 27 (1992), pages 161–176; Petr Tichavský and Peter Händel, *Two Algorithms for Adaptive Retrieval of Slowly Time-Varying Multiple Cisoids in Noise*, IEEE Transactions on Signal Processing, Vol. 43, No.5, May 1995, pages 1116–1127; Petr Tichavský and Arye Nehorai, *Comparative Study of Four Adaptive Frequency Trackers*, IEEE Transactions on Signal Processing, Vol. 45, No. 6, June 1997, pages 1473–1484; Petr Tichavský and Peter Händel, *Recursive estimation of linearly or harmonically modulated frequencies of multiple cisoids in noise*, In: International Conference on Acoustics, Speech and Signal Processing, ICASSP Committee, Munich, 1997, pages 1925–1928. The foregoing are only provided as examples of frequency tracking methods which may be used with the invention, and it is to be understood that frequency tracking methods that may be used in the context of this invention are not limited to the foregoing examples.

These and other frequency tracking algorithms operate on time-sampled data. These algorithms estimate the instantaneous angular frequencies $\omega$ of one or more real-valued sinusoids or complex-valued cisoids in noise. In the case of a sinusoid, the angular frequency $\omega$ is related to the frequency $f$ of the sinusoid and the sampling frequency $f_s$.

$$\omega = 2\pi \frac{f}{f_s} \qquad (2)$$

A first embodiment of the invention will now be described. A signal consisting of a telemetry signal, mud pump noise and background noise is received by the transducers (130, 132 in FIG. 1) at the earth's surface. The $M^{th}$ harmonic of the mud pump noise is present at a frequency that is within the telemetry band and interferes with the reception of the wanted telemetry signal. Because the $M^{th}$ harmonic of the mud pump noise is present in the same band as the telemetry signal, it is usually not possible to obtain very good estimates of the characteristics (amplitude, frequency and phase) of the interfering noise from measurements made directly on the $M^{th}$ harmonic. The angular frequency of the $M^{th}$ harmonic is related to the angular frequency of the fundamental harmonic of the mud pump as described in Equation 3.

$$\omega_M = M\omega_i \qquad (3)$$

Better estimation of the characteristics of the mud pump noise can be obtained by exploiting the harmonic relationship between the noise tones. Consider a harmonic of the mud pump noise that is present at a frequency outside the telemetry signal band, for example, the $N^{th}$ harmonic. As described earlier, the ratio of the power in this $N^{th}$ harmonic to the background noise level can be very high. A frequency tracking algorithm is used to track this $N^{th}$ harmonic. At a discrete time n, the frequency tracking algorithm provides an estimate of the instantaneous angular frequency of the $N^{th}$ harmonic. The estimate of the instantaneous angular frequency of the $M^{th}$ harmonic is then determined from the estimate of the instantaneous angular frequency of the $N^{th}$ harmonic as described in Equation 4.

$$\hat{\omega}_M(n) = \frac{M}{N}\hat{\omega}_N(n) \qquad (4)$$

The superscript ^ is used to denote an estimated value. An estimate of the instantaneous phase $\theta_M$ of the $M^{th}$ harmonic can be determined from Equation 5.

$$\hat{\theta}_M(n) = \sum_{i=1}^{n} \hat{\omega}_M(i) \qquad (5)$$

$$= \hat{\theta}_M(n-1) + \hat{\omega}_M(n)$$

The instantaneous phase may be initialized to the initial phase of the $M^{th}$ harmonic if it can be easily estimated, otherwise it may be initialized to 0. In this embodiment of the invention, the initial phase of the noise tone is not a critical parameter and does not need to be estimated. A sample of a noise reference waveform $w_M$ for the $M^{th}$ harmonic of the noise can be generated from the instantaneous phase at discrete time n.

$$w_M(n) = \cos(\hat{\theta}_M(n)) \qquad (6)$$

The noise reference waveform is then used as a reference input to an adaptive noise canceling system. Bernard Widrow et al. in, *Adaptive Noise Cancelling: Principles and Applications*, Proceedings of the IEEE, Vol. 63, No. 12, December 1975, pages 1692–1716 and John P, Glover in *Adaptive Noise Canceling Applied to Sinusoidal Interferences*, IEEE Transactions on Acoustics, Speech and Signal Processing, Vol. ASSP-25, No. 6, December 1977, pages 484–491 describe typical adaptive noise canceling systems.

Figure 8:
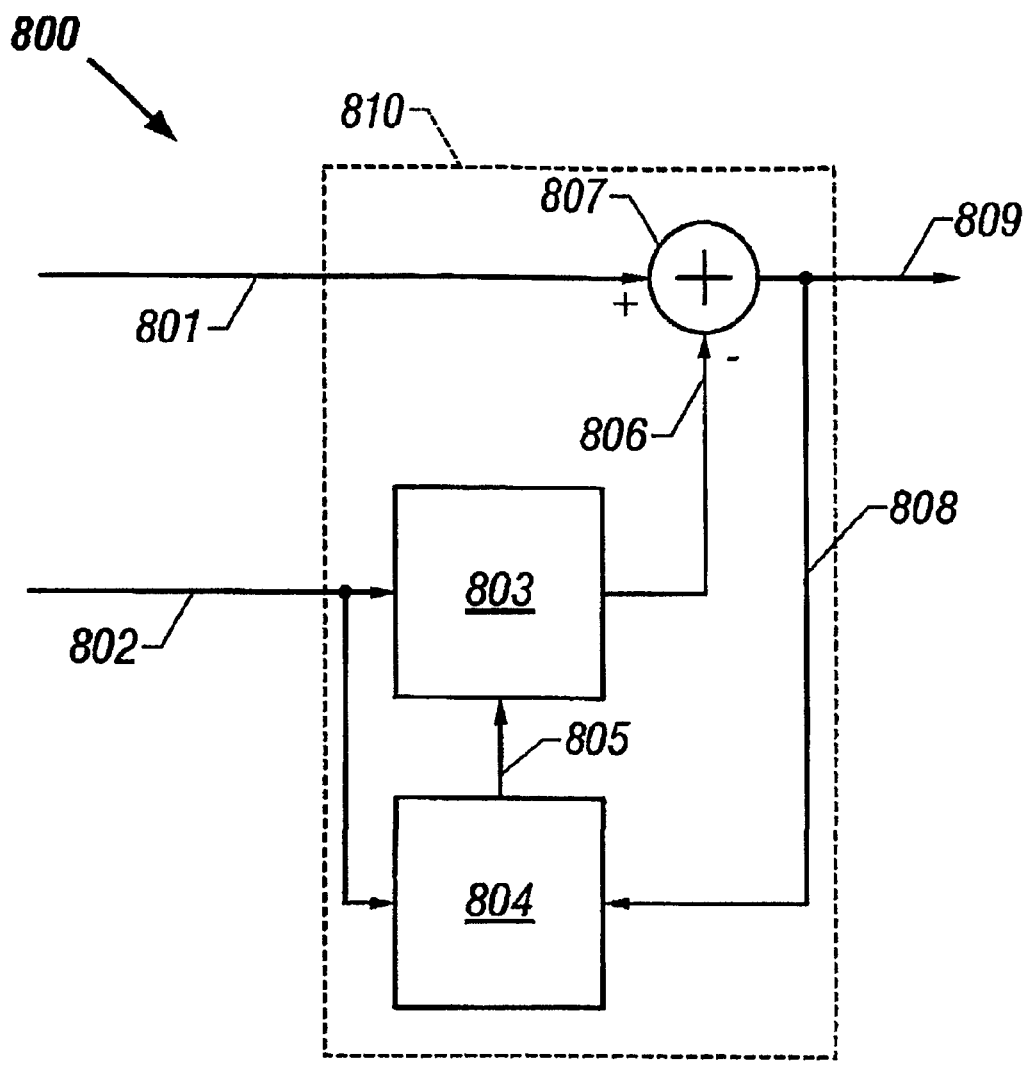
FIG. 8 is schematic of a typical adaptive noise canceler.

FIG. 8 shows a typical adaptive noise cancellation system 800 that may be used with various embodiments of the invention. A primary input 801 to a noise canceler 810 is the telemetry signal plus the interfering noise. A reference input 802 to the noise canceler 810 is the noise reference, generated as previously explained. The reference input 802 is convolved with coefficients of an adaptive filter 803 to produce a filter output 806. The filter output 806 is then subtracted from the primary input 801 in a summing unit 807. If the output 806 of the adaptive filter 803 closely matches the characteristics of the noise present in the primary input 801, then an output 809 of the summing unit 807 will consist of the telemetry signal component in the primary input 801 with the interfering noise substantially reduced. An adaptive algorithm 804 provides updated coefficients 805 for the adaptive filter 803. The adaptive algorithm 804 takes as its inputs the reference input 802 and the output 809 of the summing unit 807. Commonly used algorithms for adapting the coefficients of adaptive noise canceling filters, for example, least-mean-square (LMS) and recursive least square (RLS) algorithms, attempt to minimize variance in the output 809 of the sung unit 807. Descriptions of typical LMS, RLS and other adaptive algorithms, are provided in, for example, Simon Haykin, *Adaptive Filter Theory*, 3$^{rd}$ Edition, Prentice Hall International Editions, 1996.

The mud pump noise components are uncorrelated with the telemetry signal, and thus the adaptive algorithm will adjust the coefficients of the adaptive filter 803 so as to reduce the mud pump noise component present in the primary input 801 while leaving the telemetry signal component largely unchanged. The use of the adaptive filter 803 in the adaptive noise canceler 810 eliminates the need to obtain accurate estimates of the amplitude and initial phase offset of the interfering mud pump noise component.

If more than one mud pump noise harmonic is causing interference within the telemetry band, then a noise reference waveform for each interfering harmonic can be generated by applying the relationships described in Equations 3, 4, 5 and 6. The tracking performance of the instantaneous frequency tracker can be improved if it is preceded by a filter that allows only the mud pump harmonic that is outside the telemetry band (and that is to be used for tracking purposes) to pass through, while suppressing frequencies outside of the filter passband. If multiple harmonics are to be tracked simultaneously, then the filter passband should be selected to allow the multiple range of harmonics to pass through the filter.

Figure 9A:
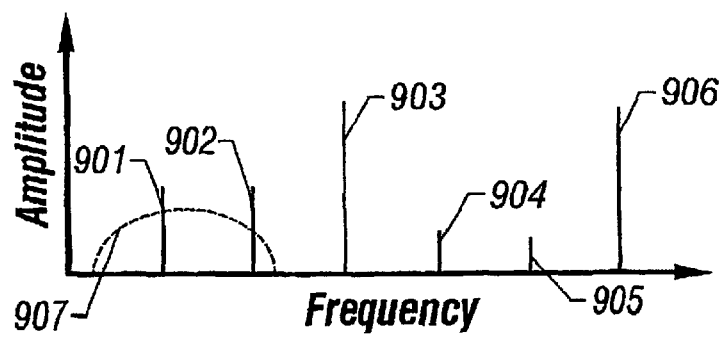
FIG. 9(*a*) is a frequency domain representation of the harmonic nature of mud pump noise from a single mud pump and how it may overlap the telemetry signal.

FIG. 9(a) shows a portion of a typical mud pump noise spectrum from a single, triplex (three-cylinder) mud pump. Only the $1^{st}$ to the $6^{th}$ harmonics 901, 902, 903, 904, 905, 906 are shown. Note that the $3^{rd}$ harmonic 903, and the $6^{th}$ harmonic 906 are larger in amplitude than the other harmonics. To illustrate how the mud pump noise cancellation system works, consider the following example. The telemetry signal 907 is transmitted in a part of the spectrum that overlaps with the fundamental harmonic 901 and the $2^{nd}$ harmonic 902 of the mud pump noise. The purpose of the harmonic noise canceler is to recover the telemetry signal component 907 without undue distortion and to reject the mud pump noise components 901 and 902.

Figure 4:
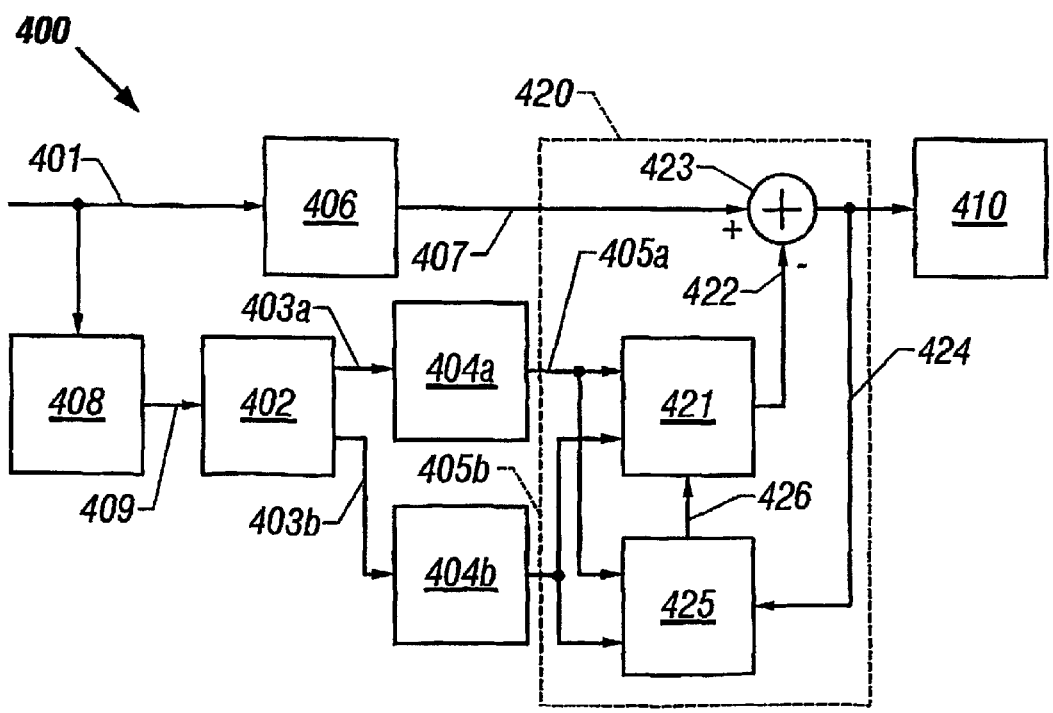
FIG. 4 is a schematic of one example of an adaptive noise canceler with a noise reference input derived from an instantaneous frequency or phase tracker.

FIG. 4 shows one embodiment of a receiver system that includes harmonic frequency tracking, adaptive noise cancellation and filtering. The input to the noise canceling system consists of digitized samples 401 of the signal 131 from the pressure transducer 130 in FIG. 1. The input samples 401 pass through a filter 408 that allows a range of frequencies, including the mud pump noise harmonic that is to be tracked, to pass through while rejecting noise at frequencies outside of the selected frequency range. In this example, it is desirable to track the $6^{th}$ harmonic 906, and therefore the filter 408 allows the $6^{th}$ harmonic 906 to pass through while suppressing other frequencies. Spectral analysis of the signals measured by pressure transducers (130, 132 in FIG. 1) can be used to estimate the approximate fundamental frequency and the harmonic frequencies of the mud pump noise so that the tracking algorithms can be set up to track the noise and generate the appropriate noise reference waveforms. Alternatively, measurements from a pump stroke counter (not shown) on the mud pumps 115 may be used to obtain the approximate mud pump noise frequencies or a user may enter the approximate mud pump stroke rates into the software program via a user interface.

The filtered mud pump noise 409 forms the input to an instantaneous frequency tracker 402. The instantaneous frequency tracker 402 estimates the instantaneous frequencies of mud pump noise components within the telemetry band, 901 and 902 from FIG. 9(a), from the filtered out-of-band component 409. The instantaneous frequency tracker 402 generates noise reference components 403 from the estimated instantaneous frequencies of the noise components inside the telemetry band. In the example shown in FIG. 4, two mud pump noise harmonics are assumed to be interfering with the telemetry signal, thus two noise reference waveforms 403a, 403b are generated by the frequency tracker 402.

In the receiver system 400 the noise cancellation section operates on complex-valued baseband samples. The complex-valued baseband samples 407 of the primary input 401 are generated by passing the real-valued primary input 401 through a quadrature mixer and baseband filter module 406. The quadrature mixer and baseband filter module 406 shifts the telemetry band that is centered on the carrier frequency down in frequency to baseband and allows telemetry signal and noise components whose frequencies lie within the telemetry band to pass through, but attenuates signals and noise outside of this frequency range. The operation of the quadrature mixer module 406 will be discussed in more detail later with reference to FIG. 6(b). The baseband samples 407 form the primary input to a complex-valued adaptive noise canceler 420. Complex-valued baseband samples 405a, 405b of the noise reference waveforms 403a, 403b are similarly generated by using quadrature mixer modules 404a, 404b. The baseband noise reference samples 405a, 405b form the noise reference input to the adaptive noise canceler 420. The structure of the adaptive filter 421 is similar to the adaptive filter 803 in FIG. 8 except that it operates on complex-valued samples.

The noise reference samples 405a, 405b are multiplied by the coefficients of the adaptive filter 421 and summed to produce an estimate of the pump noise 422. The output 422 of the adaptive filter 421 is subtracted from the primary input 407 in a summing operation 423. An adaptive algorithm 425 minimizes the variance in the output 424 of the summing operation 423. The telemetry signal and mud pump noise are not correlated with each other, so the adaptive filter adjusts the amplitude and phase of the components of the noise reference input 405 so as to cancel them from the combination of telemetry signal and mud pump noise 407. Algorithms for adapting the coefficients of the adaptive filter 421 are well known in the art. See, for example, Simon Haykin, *Adaptive Filter Theory*, $3^{rd}$ Edition, Prentice Hall International Editions, 1996.

After noise cancellation, the noise canceled signal 424 is processed by the receiver 410 to recover the data. Using the clean noise reference, derived from the instantaneous frequency tracker that tracks the mud pump noise harmonics that are outside the telemetry band, as the input to the adaptive noise canceler produces good results.

Figure 9B:
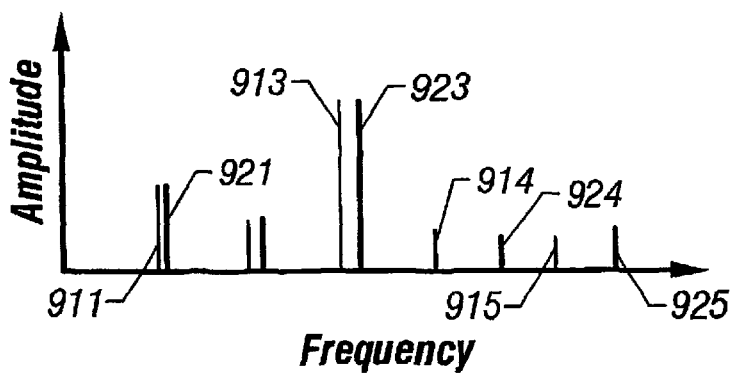

Many of the frequency tracking algorithms known in the art are able to track multiple frequencies simultaneously, or may be cascaded to effectively produce the same result. This capability to track multiple frequencies can be used advantageously in the context of this invention. If more than one mud pump is being used in a drilling system such as shown in FIG. 1, for example, and these pumps are not synchronized, then each mud pump will generate a set of harmonically-related noise tones at frequencies related to that mud pump's fundamental frequency. FIG. 9(b) shows a representation of a portion of a typical spectrum produced by two triplex mud pumps running at slightly different fundamental frequencies 911, 921. Harmonics from the different mud pumps can be tracked simultaneously.

As an example, assume that the telemetry signal is transmitted in a range of frequencies that includes the fundamental frequency ($1^{st}$ harmonic) 911, 921 of each mud pump. The instantaneous frequency tracker is set up to track the $3^{rd}$ harmonic of each mud pump 913, 923. The noise reference waveforms for the interfering harmonics 911, 921 from each mud pump can then be generated and used as inputs to an adaptive noise canceler, such as described earlier with reference to FIG. 4. Mud pumps that are synchronized will produce mud pump noise that appears to come from a single mud pump, with the total number of cylinders proportional to the number of mud pumps that are synchronized. For example, two triplex mud pumps synchronized together will produce mud pump noise similar to a single, six-cylinder pump.

The estimate of the fundamental frequency of a mud pump can be improved by simultaneously tracking several harmonics of the noise from that mud pump. This aspect the invention will now be described in more detail. Assume p mud pump noise harmonics are being tracked simultaneously by an instantaneous frequency tracker, where p is an integer and p>1. The estimate of the instantaous angular frequency of a single harmonic is given by Equation 7.

$$\hat{\omega}_h = h\omega_1 + v_k, 1 \leq k \leq p \qquad (7)$$

where h represents the harmonic number, $\omega_i$ represents the actual instantaneous angular frequency of the fundamental frequency component of the mud pump noise and $v_k$ represents an error in the estimate of the instantaneous angular frequency of the $h^{th}$ harmonic. If this were the only harmonic being tracked, then the estimate of the instantaneous angular frequency of the fundamental harmonic would be given by Equation 8.

$$\hat{\omega}_i = \frac{\hat{\omega}_h}{h} \qquad (8)$$

An improved estimate of the fundamental frequency of the mud pump can be obtained by using the estimated angular frequencies of all p harmonics that are being tracked. For example, a least squares estimate for the fundamental frequency can be obtained as shown in Equation 9.

$$\hat{\omega}_i = \frac{\sum_{k=1}^{p} h_k \hat{\omega}_{h_k}}{\sum_{k=1}^{p} h_k^2} \qquad (9)$$

Other variations on the method of tracking multiple tones simultaneously may also be used. For example, the frequency tracking algorithms themselves may be constrained to track only harmonically related tones.

Figure 6A:
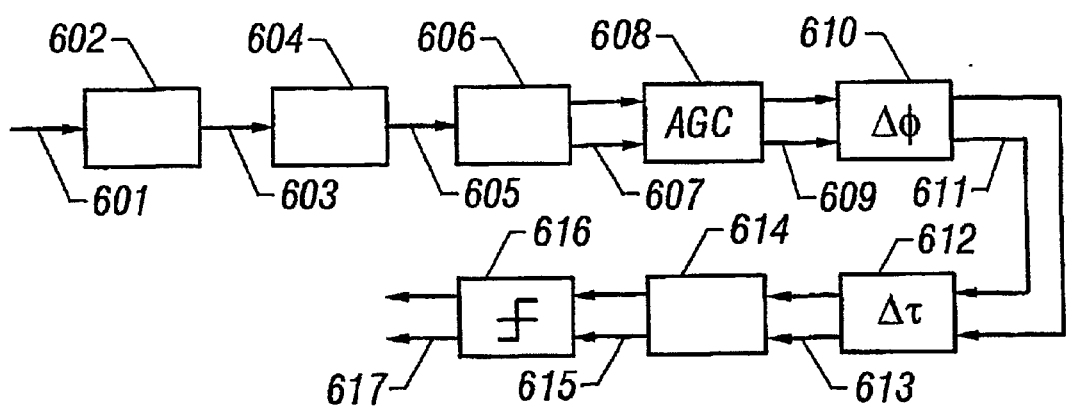
FIG. 6(*a*) is a schematic of a typical digital receiver system.
Figure 6B:
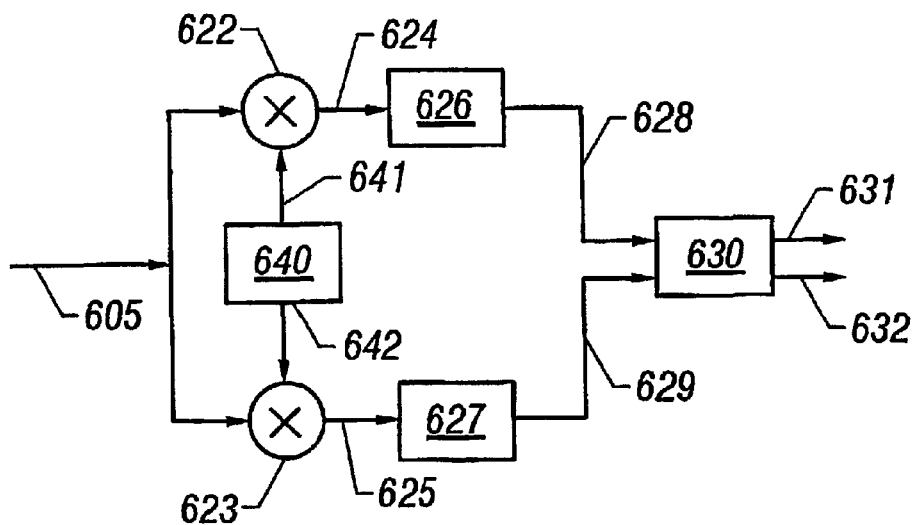

The receiver (410 in FIG. 4) may use coherent, non-coherent or differentially coherent demodulation/detection techniques, as are well known in the art. See, for example, John G. Proakis, *Digital Communications*, 3rd Edition, McGraw-Hill International Editions, 1995, pp. 254–313. One example of a typical coherent receiver that performs most of the processing at baseband is shown in FIG. 6(a). The receiver (410 in FIG. 4) may include some, or all, of the following features: a anti-alias filter 602, sampler 604, quadrature mixer module 606 including low pass filters and frequency offset correction; automatic gain control 608, phase offset correction 610; resampler and symbol timing offset correction 612; adaptive equalization 614 and a detector 616. A quadrature mixer module is shown in more detail FIG. 6(b). The signal 605 from the output of the sampler module 604 is converted to a complex baseband signal. A frequency synthesizer, or oscillator, 640 produces a pair of sinusoids 641 and 642 in phase quadrature at the carrier frequency. Multipliers 622 and 623 multiply the incoming signal 605 by the quadrature sinusoids 641 and 642. Low pass filters 626 and 627 allow the frequencies wit the range used by the telemetry signal to pass through and filter out frequencies outside of this range including the components at twice the carrier frequency produced in the mixing process. The filters 626, 627 may also be matched to the shape of the pulses transmitted by the downhole transmitter (105 in FIG. 1). The output 628 of the in-phase channel of the mixer is the real component of the complex baseband signal. Similarly, the output 629 of the quadrature channel from the mixer is the imaginary component of the complex baseband signal. If there is a frequency offset between the clocks in the downhole transmitter (105 in FIG. 1) and the surface sampling system (135 in FIG. 1), the offset may be compensated for in the frequency offset correction module 630. Alternatively, the frequency offset correction function 630 may be included within the frequency synthesizer 640. The complex output 607 of the quadrature demodulator has a real component 631 and an imaginary component 632.

Techniques that can be used to estimate, track and compensate for frequency, phase, and timing offsets are known in the art. See, for example, *Synchronization Techniques for Digital Receivers*, Umberto Mengali and Aldo N. D'Andrea, Plenum Publishing Corporation, 1997.

Referring once again to FIG. 1, both the telemetry signal from the downhole transmitter 105, and the noise from the mud pumps 115 encounter numerous acoustic reflectors as they propagate through the mud system. Examples of acoustic reflectors in the mud systems are the rotary hose 119 connecting the drill string 112 to the standpipe 118 on the surface, the pulsation dampeners 116 on the outputs of mud pumps 115, and pipe junctions or joints where pipes are connected together. Whenever a change in acoustic impedance occurs, part of the pressure waves are reflected back in the opposite direction in which they were traveling. The reflected waves interfere with subsequent waves and may result in destructive interference at some frequencies and constructive interference at other frequencies. This interference leads to inter-symbol interference in the telemetry signal and increases the probability of errors in the detected data symbols. An adaptive equalizer may also be included in the receiver to reduce, or compensate for, distortion in the telemetry signal received at the surface sensors.

Figure 5A:
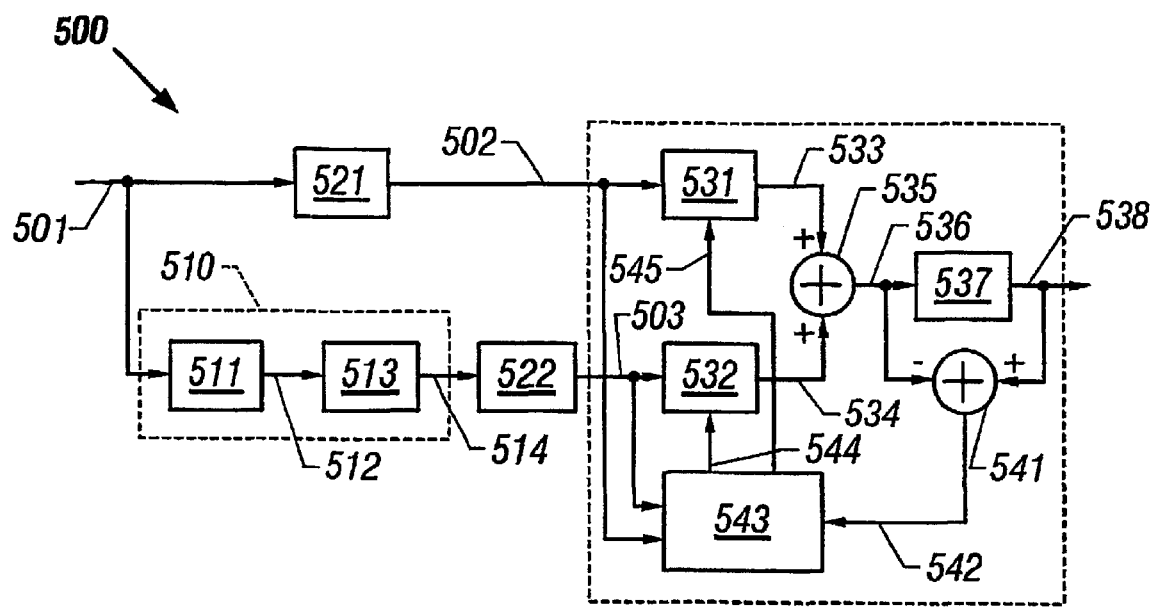
FIG. 5(*a*) is a schematic of one example of a combined equalizer/noise canceler based on a multi-channel equalizer structure.

Adaptive noise cancellation may also be performed jointly with adaptive equalization. In embodiments of joint adaptive equalization/noise cancellation, the noise reference waveform may be used as a separate input to a multi-channel adaptive equalizer. FIG. 5(a) shows a possible embodiment of such a combined equalizer/noise canceler. The input 501 to the system 500 consists of digitized samples of the signal from a sensor, for example samples of the detected signal (131 in FIG. 1). Prior to the multi-channel equalizer, the input signal 501 is converted in a conversion module 521 to a first complex baseband signal 502. The conversion module 521 may also perform filtering, automatic gain control and correct for carrier frequency, phase and symbol timing offsets. A noise reference waveform 514 is generated by a frequency tracker 513 that takes as its input the output of a noise band filter 511. The estimation and generation of the noise reference waveform can be performed, in some embodiments, as previously described with reference to FIG. 4 and FIG. 8. The noise reference 514 is converted 522 to a second complex baseband signal 503. The same frequency offset correction operations applied to the other branch 501, 521 should also be applied to the noise reference branch 514, 522.

The multi-channel equalizer/noise canceler works as follows. The noise reference input (second complex baseband signal 503) allows the adaptive filter 531 to compensate primarily for signal distortion in the signal input (first complex baseband signal 502), while adaptive filter 532 provides the required amplitude and phase adjustments to the noise reference input 503 to cancel the harmonic noise components in the signal input 502. The output 533 of filter 531 is summed with the output 534 of filter 532 in a summing operator 535. The combined output 536 forms the input to the detector 537. The detector 537 makes a decision 538 about the symbol that was received.

In decision-directed mode, an error term 542 is generated by subtracting the detector input 536 from the detector output 538. If a training sequence (a known sequence of symbols sent by the transmitter) is available to the receiver (601–617 in FIG. 6(*a*)), it may be used to determine the error term 542 used to train the adaptive filters 531, 532 in place of the symbol decisions 538. A training sequence is usually required for initial training of the equalizer. The error term 542 is used by an adaptive algorithm 543. The adaptive algorithm 543 jointly adapts the coefficients 544 of filter 532 and the coefficients 545 of filter 531 to minimize the noise and signal distortion at the detector input 536.

Figure 5B:
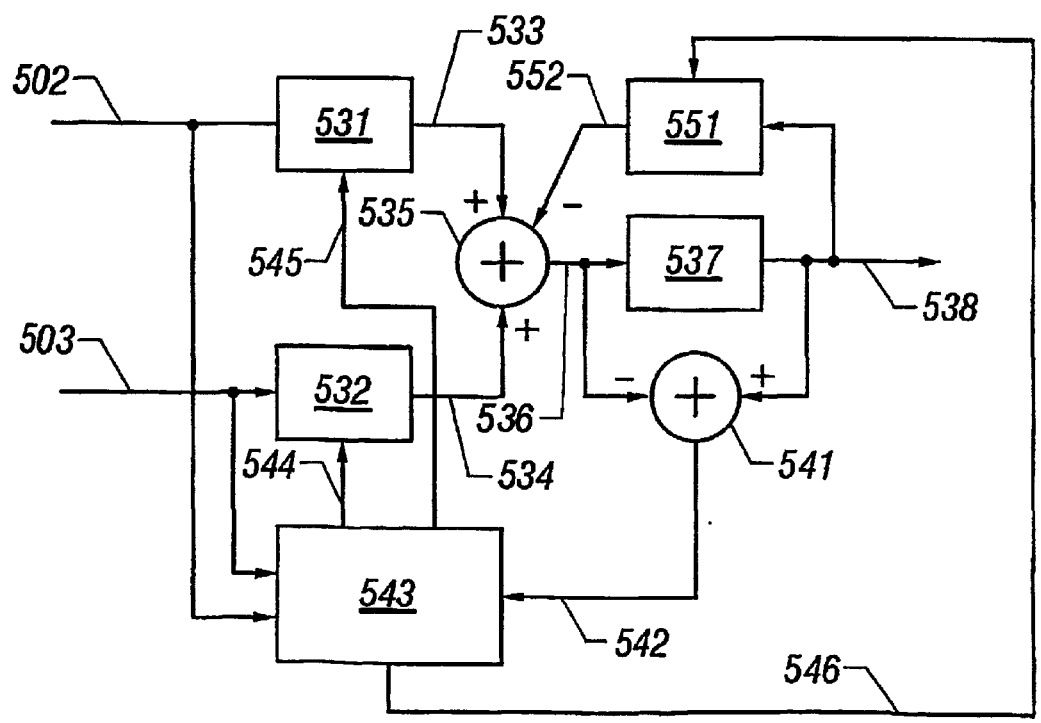

A decision feedback section may also be added to improve equalization, as shown in FIG. 5(*b*). The arrangement shown in FIG. 5(*b*) includes a feedback filter 551 added to the multi-channel equalizer arrangement of FIG. 5(*a*). Previous decisions 538 from the detector 537 are used as inputs to the feedback filter 551. The output 552 of the feedback filter 551 is subtracted from the sum of the outputs 533, 534 of forward filters 531, 532. The coefficients 546 of the feedback filter 551 are jointly adapted with the coefficients 544, 545 of the forward filters 531, 532.

The filters 531, 532, 551 may be linear transversal filters, with symbol-spaced taps or fractionally-spaced taps. Symbol detection 537 is usually performed on a symbol-by-symbol basis. Multi-channel equalizers are well known in the art. See for example, U.S. Pat. No. 3,879,664 issued to Monsen, U.S. Pat. No. 4,271,525 issued to Watanabe, U.S. Pat. No. 4,328,585 issued to Monsen, U.S. Pat. No. 4,829,543 issued to Borth et al., U.S. Pat. No. 5,031,193 issued to Atkinson et al., and Stojanovic et al., *Adaptive multichannel combining and equalization for underwater acoustic communications*, Journal of the Acoustical Society of America, Vol. 94, Part 1, September 1993, pp. 1621–1631.

There are also equalizers/detectors that make symbol decisions based on received samples spanning a group of symbols, or by determining the most likely sequence of symbols. These detector/equalizers usually include some means for estimating the impulse response of the channel that causes the signal distortion. Maximum likelihood sequence estimator (MLSE) and maximum a-posteriori (MAP) receivers are examples of equalizer/detectors that do not make symbol decisions on a symbol-by-symbol basis. All these equalizer as well as other types of equalizers are known in the art. See, for example, *Digital Communications*, supra pp. 583–679.

Equalizers based on neural networks, such as multi-layer perceptions or radial basis function networks, may alternatively be used. Examples of these equalizers are described in, *Adaptive Filter Theory*, S. Haykin, 3d Edition, Prentice Hal International, Inc. (1996) pp. 817–874. The equalizers may also be hybrids of the previously mentioned equalizers. For example, the feedback section of a decision feedback equalizer may be used as part of a maximum-likelihood sequence estimator, as described in, *Developments of the conventional nonlinear equalizer*, A. P. Clark et al., IEEE Proceedings, Vol. 129, Pt. F, No.2, April 1982, pages 82–94. Examples of hybrid equalizers that use radial basis function components are described in, *Applying Radial Basis Functions*, Bernard Muigrew, IEEE Signal Processing Magazine, March 1996, pp. 50–65. Certain types of equalizers, such as Volterra filters and neural network filters may help to reduce non-linear distortion in the signal. Examples of publications describing these equalizers include, *Adaptive Filter Theory*, S. Haykin, supra pp. 16–18, and, *Channel Equalization Using Adaptive Complex Radial Basis Function Networks*, Inhyok Cha et al., IEEE Journal on Selected Areas in Communications, Vol. 13, No.1, January 1995 and *Nonlinear Equalizer for Measurement While Drilling Telemetry System*, W. R Gardner and G A. Merchant, U.S. Pat. No. 5,490,121.

In a typical embodiment, the adaptive algorithm 543 minimizes the mean squared error between the samples of the received signal and an ideal reference signal. Other criteria for adjusting the filter tap weights are known in the art, for example, zero-forcing or minimizing peak distortion, or tap values based on channel estimation, and may be used instead of minimization of mean squared error. Adaptive filter algorithms that are commonly used to determine the filter coefficients are described, for example, in *Adaptive Filter Theory*, supra, and *Efficient Least Squares Adaptive Algorithms for FIR Transversal Filtering*, G. O. Glentis, et al., IEEE Signal Processing, July 1999, pp. 13–41. Blind, or semi-blind, adaptive algorithms are yet more alternatives for adapting the tap weights. Examples of such algorithms are presented in, *Adaptive Filter Theory*, supra, pp. 772–816. Equalization and noise cancellation may be carried out at baseband or on the passband signal prior to conversion to baseband.

The combined equalization, noise canceling technique described previously may be further extended to include "diversity combining". Measurements from multiple sensors (at the earth's surface) on the MWD system which are spatially-separated from each other (or otherwise arranged to detect the telemetry signal wherein each sensor's detected signal has a different phase from the other) may be used to further improve detection of the telemetry signal. Waves travelling from the downhole transmitter (105 in FIG. 1) towards the sensors on the surface (such as 130, 132 in FIG. 1) called forward traveling waves, encounter acoustic reflectors along the travel path (where mud pulse telemetry is used). Usually some part of the wave is transmitted and some part is reflected at each such acoustic reflector. The reflected waves travel in the opposite direction to the transmitted waves. Examples of acoustic reflectors include changes in pipe diameter, pipe junctions, the bottom of the well, the kelly (153 in FIG. 1), swivel (154 in FIG. 1), rotary hose (119 in FIG. 1), pulsation dampeners (116 in FIG. 1) and the mud pumps (115 in FIG. 1). The reflected waves may also themselves be subject to further reflections. Constructive and destructive interference of the waves results. The positions of nodes and anti-nodes of the interference patterns are frequency dependent. At one location, for example at the sensor located at the top of the standpipe (130 in FIG. 1), the forward and reverse traveling waves may be in-phase at a particular frequency, resulting in constructive interference, while at another location, for example at the sensor located near the drill floor (132 in FIG. 1), the waves may be out of phase resulting in destructive interference at that frequency.

Diversity combining using multi-channel equalizers can be used in some embodiments of the invention to improve signal detection. Multi-channel equalizers are well known in the art. See for example U.S. Pat. No. 3,879,664 issued to Monsen, U.S. Pat. No. 4,271,525 issued to Watanabe, U.S.

Pat. No. 4,328,585 issued to Monsen, U.S. Pat. No. 4,829,543 issued to Borth et al., U.S. Pat. No. 5,031,193 issued to Atkinson et al. and, *Adaptive multichannel combining and equalization for underwater acoustic communications*, Stojanovic et al., Journal of the Acoustical Society of America, Vol. 94, Part 1, September 1993, pp. 1621–1631.

Figure 7A:
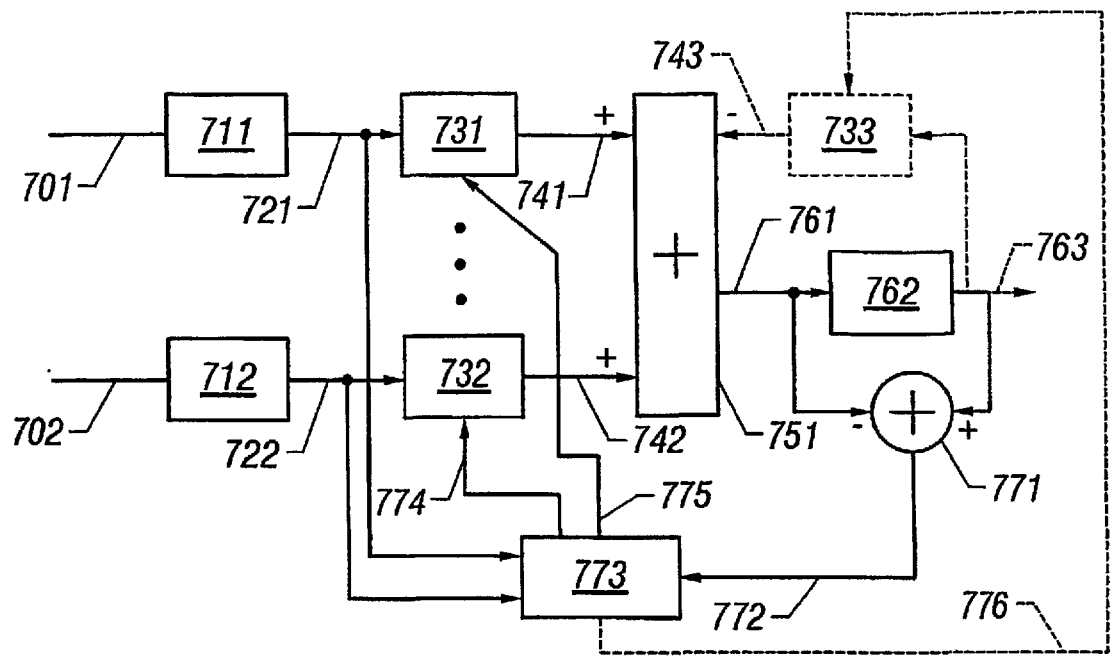
FIG. 7(*a*) is a schematic of multi-channel diversity receiver incorporating harmonic noise cancellation on each input.

One embodiment of a multi-channel equalizer with noise cancellation is shown in FIG. 7(a). Two or more inputs (shown as 701, 702 in FIG. 7(a)) are obtained from samples from sensors, for example samples of the signals (131, 133 from sensors 130, 132 in FIG. 1). Noise cancellation modules 711, 712 reduce the harmonic noise present in the input signals 701, 702. The noise cancellation modules 711, 712 may perform the processes described with reference to FIG. 4 and FIG. 8. The outputs 721, 722 of the noise cancellation modules 701,702 may be converted (not shown) to complex baseband signals. Signals 721 and 722 form the inputs to parallel forward filters 731, 732 of a multi-channel equalizer/combiner. The outputs 741, 742 of the parallel forward filters 731, 732 are summed, at 751, to produce an input 761 to a detector 762. The detector 762 makes a decision 763 about which symbol was received.

The equalizer performance may be improved by adding a decision-feedback section. Previous symbol decisions may be used as inputs to a feedback filter 733. The output 743 of the feedback filter 733 is then subtracted from the sum of the outputs 741, 742 of the forward filters 731, 732 in the summing operator 751. The output 761 of the summing operator 751 is used as the input to the detector 762.

Figure 7B:
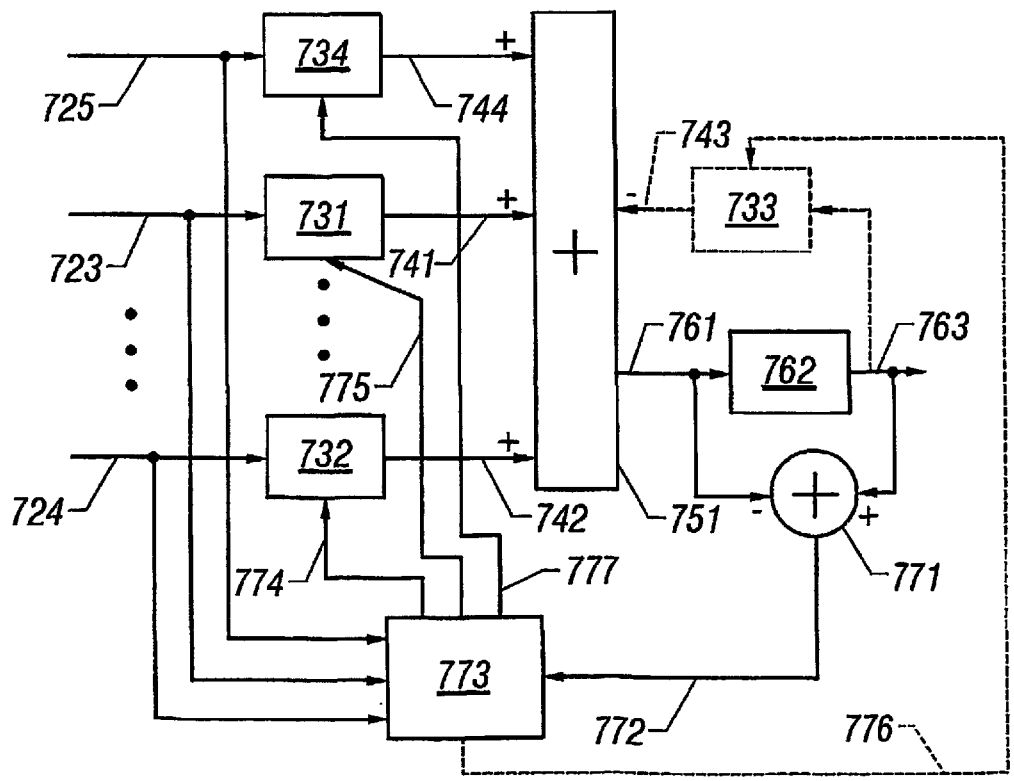

The noise cancellation operation may be included as part of a multi-channel equalizer as shown in FIG. 7(b), rather than preceding the equalizer. At least one noise reference signal 725 is obtained from a frequency tracker module as previously described. The noise reference 725 forms the input to an additional forward filter 734 of the multi-channel equalizer. The inputs 723, 724 to the other parallel forward filters 731, 732 are obtained from signals from the surface sensors, for example signals 131, 133 from sensors 130, 132, (in FIG. 1) without the noise cancellation modules 711, 712 in each signal branch.

The detector 762 need not make decisions on a symbol-by-symbol basis. The sequence estimation methods described previously may also be used with various embodiments of a multi-channel equalizer system.

The filter coefficients 774, 775, 776, 777 in this embodiment are determined by an adaptive algorithm 773. Initial filter coefficients may be determined, for example, by transmitting a known training sequence. Alternatively, blind or semi-blind adaptive techniques may be used. Decision-directed updating may then be used. An error signal 772 is obtained from the difference between the detector input 761 and the detector output 763. The error signal 772 is used by the adaptive algorithm 773 to update the filter coefficients 774, 775, 776, 777.

In the descriptions of the previous embodiments, the instantaneous frequency of a mud pump noise tone was the characteristic that was being tracked, and therefrom a noise reference waveform was generated for use in an adaptive noise canceler. An alternative characteristic of the mud pump harmonics that may be tracked is the instantaneous phase of a sinusoid or cisoid. The harmonic relationship between noise tones that is present in the instantaneous frequencies of the mud pump noise tones, that was exploited in order to generate reference waveforms of the noise tones that occur within a telemetry band, is also present in the instantaneous phases of the mud pump noise tones. Therefore the instantaneous phase of a mud pump noise harmonic may be tracked and from that may be derived the instantaneous phase characteristic of another harmonic. One possible method of tracking the instantaneous phase of a sinusoid or cisoid in noise is to use a phase-locked loop. Phase-locked loops are well known in the art. See, for example, Roland E. Best, *Phase-Locked Loops: Design, Simulation and Applications*, 4$^{th}$ Edition, McGraw-Hill Professional Publishing, 1999, and P. V. Brennan *Phase-Locked Loops: Principles and Practice*, MacMillan Press Ltd, 1996.

Figure 10:
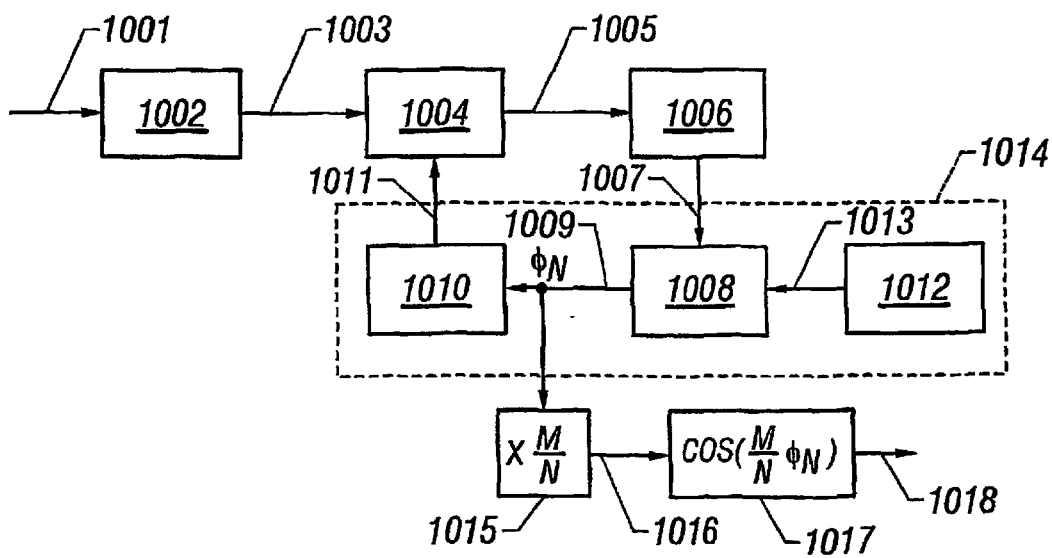
FIG. 10 is a schematic of a digital phase locked loop for tracking a harmonic of a noise component.

An example of a phase-locked loop (PLL) is shown in FIG. 10. For illustrative purposes assume that the harmonic to be tracked is the N$^{th}$ harmonic of the mud pump noise. Using a PLL a noise reference waveform is to be derived for the M$^{th}$ harmonic. Samples 1001 taken from measured signals 131 from a sensor (130 in FIG. 1) form the input to a filter 1002 that allows a range of frequencies including the N$^{th}$ harmonic of the mud pump noise to pass through, and suppresses signals at other frequencies. The filter 1002 is not a part of the PLL itself, but in this example helps to improve the PLL's estimate of the phase of the mud pump noise harmonic, especially if several very large noise tones are present in the mud pump noise spectrum. The output 1003 of the filter 1002 is a sinusoid, or cisoid if complex baseband samples are used, with additive background noise. The sinusoid 1003 is the first input to a phase comparator 1004. The output 1011 of a voltage controlled oscillator (VCO) 1014 forms the second input to the phase comparator 1004. In digital implementations of phase locked loops, the voltage controlled oscillator is sometimes known as a numerically controlled oscillator (NCO). An error signal 1005, representative of the difference in phase between the first 1003 and second 1011 inputs to the phase comparator 1004, forms the output 1005 of the phase comparator 1004. The error signal 1005 is filtered by a loop filter 1006. The output of the loop filter 1007 is the input to the VCO 1014. In a typical digital or software implementation of a phase-locked loop the VCO consists of an accumulator 1008, clock 1012 and a sine wave generator 1010. The filtered phase errors 1007 are accumulated (that is summed or integrated) in the accumulator 1008 and added to phase increments 1013 from the VCO clock 1012. The output 1009 of the accumulator is an estimate of the instantaneous phase ON of the input 1003 to the phase comparator 1004. A sine wave generator 1010 produces a waveform 1011 that is an estimate of the input signal 1003. When the loop is locked onto the input signal 1003, the loop signal 1011 tracks the frequency and phase of the input signal 1003.

An estimate of the instantaneous phase of the M$^{th}$ harmonic 1016 is obtained from the instantaneous phase estimate 1009 by multiplying it by conversion factor 1015 that represents the harmonic relationship between the N$^{th}$ and M$^{th}$ harmonics. A reference waveform for the AP harmonic 1018 is generated by a sine wave generator 1017. The noise reference waveform is then used as the input to an adaptive noise canceler, as discussed with respect to previous embodiments. An estimate of the instantaneous frequency of the M$^{th}$ harmonic can be obtained from the phase difference between successive samples of the instantaneous phase estimate 1016.

This method can easily be extended to produce multiple reference waveforms or to track multiple tones using multiple independent PLLs or even cross-coupled PLLs.

Figure 3:
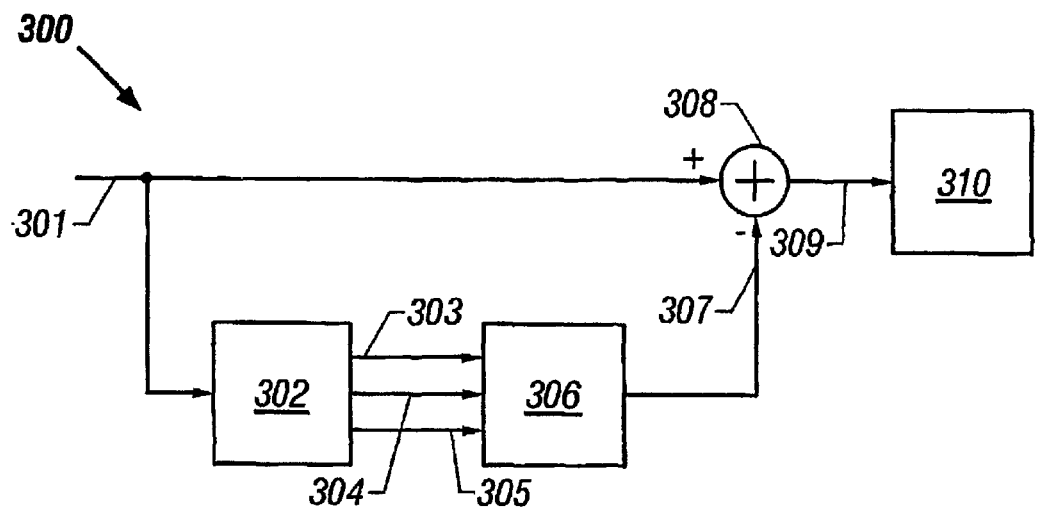
FIG. 3 is a schematic of one example of a subtractive noise cancellation system that includes a noise regenerator based on estimates of the instantaneous frequency, amplitude and phase of the noise.

FIG. 3 shows one embodiment of an alternative method for mud pump noise cancellation that does not use an adaptive noise canceler such as shown in FIG. 8. The noise cancellation system 300 according to this embodiment of the invention is shown with a single input channel. Digitized samples 301 of the signal 131 from transducer (130 in FIG. 1 located on the standpipe 118 in FIG. 1) form the inputs to the noise canceling system 300. A harmonic noise tracker 302 tacks the instantaneous frequencies of the mud pump harmonics. The harmonic noise tracker 302 includes the instantaneous angular frequency tracking described previously and also estimates the amplitude and phase offset of each harmonic component of the mud pump noise that falls within the range of frequencies occupied by the telemetry signal. The amplitudes 304, phase offsets 305 and instantaneous frequencies 303 of the mud pump noise components are passed to a noise reconstruction module 306. The mud pump noise components within the telemetry band may then be predicted and reconstructed 307, so that the noise can be subtracted in a summing unit 308 from the signal 301 that contains both the telemetry signal components and the mud pump noise components. After noise cancellation, the noise-canceled signal 309 may be processed further by a receiver 310 to recover the transmitted data. Interference cancellation by subtraction (superposition) requires that the amplitude and phase of each interfering noise harmonic be accurately estimated. The instantaneous frequency of the interfering noise harmonics may be estimated as discussed previously. Once the instantaneous frequencies of the noise tones have been estimated, the amplitudes and phase offsets of the interfering noise tones within the telemetry band can be estimated. One such method for estimating the amplitude and phase of the noise tones is by correlation of a sequence of samples of the telemetry signal and interfering noise with complex sinusoids at the estimated noise frequencies.

The aforementioned embodiments of the invention all use estimates of the instantaneous frequency or instantaneous phase of out-of-band mud pump noise harmonics to generate a reference wave for the in-band mud pump noise harmonic, and then subtract the reference wave from the detected signal comprising both telemetry signal and mud pump noise. An alternative method for suppressing the in-band mud pump noise is to use a tracking notch filter. A notch filter attenuates signals in a narrow frequency range around the notch frequency and allows signals at all other frequencies to pass through. Examples of adaptive notch filters are described in: Arye Nehorai, *A Minimal Parameter Adaptive Notch Filter With Constrained Poles and Zeros*, IEEE Transactions on Acoustics, Speech and Signal Processing, Vol. ASSP-33, No.4, August 1985, pages 983–996; Bor-Sen Chen, Tsang-Yi Yang and Bin-Hong Lin, *Adaptive notch filter by direct frequency estimation*, Signal Processing 27 (1992), pages 161–176; Petr Tichavský and Peter Händel, *Two Algorithms for Adaptive Retrieval of Slowly Time-Varying Multiple Cisoids in Noise*, IEEE Transactions on Signal Processing, Vol. 43, No.5, May 1995, pages 1116–1127; Petr Tichavský and Arye Nehorai, *Comparative Study of Four Adaptive Frequency Trackers*, IEEE Transactions on Signal Processing, Vol. 45, No. 6, June 1997, pages 1473–1484; Petr Tichavský and Peter Händel, *Recursive estimation of linearly or harmonically modulated frequencies of multiple cisoids in noise*, In: International Conference on Acoustics, Speech and Signal Processing, ICASSP Committee, Munich, 1997, pages 1925–1928.

In the context of mud pump noise interfering with a telemetry signal, the adaptive notch filter parameters can be estimated directly from the in-band signals and noise using algorithms such as those mentioned. However, the amplitude of the interfering noise tones may be smaller than or of the same order of magnitude as the telemetry signal, and as a result it might be difficult to obtain very good estimates for the required notch parameters. Better performance can be obtained by instead tracking large amplitude mud pump harmonics that are outside the telemetry band and then deriving the notch filter parameters from these. For example, consider a notch filter for real-valued input signals with notches at n angular frequencies ω with a transfer function of the form shown in Equation 10 and Equation 11.

$$H(z^{-1}) = \frac{A(z^{-1})}{A(rz^{-1})}, 0 \le r < 1 \tag{10}$$

$$A(z^{-1}) = \prod_{i=1}^{n}(1 - 2z^{-1}\cos\omega_i + z^{-2}) \tag{11}$$

As an instantaneous frequency tracking algorithm tracks the out-of-band noise tones it can be used to produce estimates of the in-band instantaneous angular frequencies $\omega_i$ as described earlier herein. Thus, very good quality estimates for the required parameters of the in-band notch filter can be obtained. In addition, the notch filter is able to track changes in the mud pump noise harmonics as the mud pump operating rate (stroke rate) changes. Notch filters with transfer functions different from those shown in Equation 10 and Equation 11 could similarly be updated.

Although the foregoing embodiments have been explained in terms of mud pulse telemetry used with MWD systems, it should be clear that the invention is not limited to detection of mud pulse telemetry. The invention is equally applicable with other telemetry systems, such as electromagnetic telemetry. Where electromagnetic telemetry is used, as explained in the Background section herein, some of the noise present in the detected telemetry signal includes electrical rig noise. Such noise can be tracked and reduced in its effect using various embodiments of the invention.

What is claimed is:

1. A method for reducing noise in a measured telemetry signal, comprising:
   tracking a characteristic of at least one harmonic of a noise component in the measured telemetry signal, the at least one harmonic having a frequency outside a telemetry signal band;
   determining the characteristic of the noise component for at least one other harmonic thereof, the at least one other harmonic having a frequency inside the telemetry signal band, and generating a noise reference therefrom; and
   combining the noise reference with the measured telemetry signal to generate a noise-canceled telemetry signal.

2. The method as defined in claim 1, wherein the combining comprises adaptive noise canceling.

3. The method as defined in claim 1, wherein the characteristic comprises instantaneous frequency.

4. The method as defined in claim 1 wherein the characteristic comprises instantaneous phase.

5. The method as defined in claim 1 wherein the noise component comprises mud pump noise.

6. The method as defined in claim 1 wherein the noise component comprises noise from a plurality of unsynchronized mud pumps, and the tracking further comprises tracking multiple instantaneous frequencies outside the telemetry signal band.

7. The method as defined in claim 1 further comprising:
   tracking the characteristic for a plurality of harmonics of the noise component, the plurality of harmonics each having a frequency outside the telemetry signal band; and generating the noise reference from the tracked characteristic of the plurality of harmonics.

8. The method as defined in claim 7 wherein the characteristic comprises instantaneous frequency.

9. The method as defined in claim 1 further comprising extracting a data stream from the measured telemetry signal.

10. The method as defined in claim 9 wherein the extracting comprises adaptive equalizing to reduce inter-symbol errors in the extracted data stream.

11. The method as defined in claim 10, wherein the adaptive equalizing and the combining are performed in a combined adaptive noise canceler/adaptive equalizer.

12. The method as defined in claim 1 further comprising:
diversity combining outputs of a plurality of sensors used to measure the telemetry signal; and
multichannel equaling the diversity combined sensor outputs.

13. The method as defined in claim 1 wherein the generating the noise reference comprises estimating an amplitude and instantaneous phase of each harmonic of the noise component having a frequency inside the telemetry signal band and reconstructing portions of the noise component having frequencies within the telemetry signal band, and the combining comprises summing the reconstructed portions of the noise with the measured telemetry signal.

14. The method as defined in claim 1 further comprising bandpass filtering the measured telemetry signal within a passband including the at least one harmonic outside the telemetry signal band and excluding the telemetry signal band to enhance the tracking of the characteristic.

15. The method as defined in claim 1 further comprising bandpass filtering the measured telemetry signal within the telemetry passband prior to the combining.

16. The method as defined in claim 1 further comprising:
bandpass filtering the measured telemetry signal within a passband including the at least one harmonic outside the telemetry signal band and excluding the telemetry signal band; and
bandpass filtering the measured telemetry signal within the telemetry passband prior to the combining.

17. The method as defined in claim 1 further comprising spectrally analyzing the measured telemetry signal.

18. The method as defined in claim 17 further comprising initializing a passband filter adapted to exclude components of the measured signal within the telemetry signal band, the initializing the passband filter based on an output of the spectrally analyzing.

19. The method as defined in claim 17 further comprising initializing a frequency range of a tracker used to perform the tracking the characteristic, the initializing the frequency range based on an output of the spectrally analyzing.

20. A method for reducing noise in a measured telemetry signal, comprising.
tracking a frequency of at least one harmonic of a noise component in the measured telemetry signal, the at least one harmonic having a frequency outside a telemetry signal band;
determining the frequency of the noise component for at least one other harmonic thereof, the at least one other harmonic having a frequency inside the telemetry signal band;
setting a notch filter to exclude the at least one other frequency; and
filtering the measured telemetry signal using the notch filter.

21. The method as defined in claim 20 further comprising extracting a data stream from the measured telemetry signal.

22. The method as defined in claim 21 wherein the extracting comprises adaptive equalizing to reduce inter-symbol errors in the extracted data stream.

23. The method as defined in claim 20 further comprising:
diversity combining outputs of a plurality of sensors used to measured the telemetry signal; and
multichannel equalizing the diversity combined sensor outputs.

24. A method for measurement while drilling comprising:
measuring at least one parameter in a wellbore during the drilling thereof;
converting the measured parameter into a telemetry format in the wellbore and transmitting the telemetry format;
measuring a telemetry signal corresponding to the transmitted telemetry format;
tracking a characteristic of at least one harmonic of a noise component in the measured telemetry signal, the at least one harmonic having a frequency outside a telemetry signal band;
determining the characteristic of the noise component for at least one other harmonic thereof, the at least one other harmonic having a frequency inside the telemetry signal band, and generating a noise reference therefrom; and
combining the noise reference with the measured telemetry signal to generate a noise-canceled telemetry signal.

25. The method as defined in claim 24, wherein the combining comprises adaptive noise canceling.

26. The method as defined in claim 24, wherein the characteristic comprises instantaneous frequency.

27. The method as defined in claim 24 wherein the characteristic comprises instantaneous phase.

28. The method as defined in claim 24 wherein the noise component comprises mud pump noise.

29. The method as defined in claim 28 wherein the noise component comprises noise from a plurality of unsynchronized mud pumps, and the tracking further comprises tracking multiple instantaneous frequencies outside the telemetry signal band.

30. The method as defined in claim 24 further comprising:
tracking the characteristic for a plurality of harmonics of the noise component, the plurality of harmonics each having a frequency outside the telemetry signal band; and
generating the noise reference from the tracked characteristic of the plurality of harmonics.

31. The method as defined in claim 30 wherein the characteristic comprises instantaneous frequency.

32. The method as defined in claim 24 further comprising determining the at least one measured parameter from a data stream extracted from the measured telemetry signal.

33. The method as defined in claim 32 wherein the extracting comprises adaptive equalizing to reduce inter-symbol errors in the extracted data stream.

34. The method as defined in claim 33, wherein the adaptive equalizing and the combining are performed in a combined adaptive noise canceler/adaptive equalizer.

35. The method as defined in claim 24 further comprising:
diversity combining outputs of a plurality of sensors used to measure the telemetry signal; and
multichannel equalizing the diversity combined sensor outputs.

36. The method as defined in claim 24 wherein the generating the noise reference comprises estimating an amplitude and instantaneous phase of each harmonic of the noise component having a frequency inside the telemetry signal band and reconstructing portions of the noise component having frequencies within the telemetry signal band, and the combining comprises summing the reconstructed portions of the noise with the measured telemetry signal.

37. The method as defined in claim 24 further comprising bandpass filtering the measured telemetry signal within a passband including the at least one harmonic outside the telemetry signal band and excluding the telemetry signal band to enhance the tracking of the characteristic.

38. The method as defined in claim 24 further comprising bandpass filtering the measured telemetry signal within the telemetry passband prior to the combining.

39. The method as defined in claim 24 further comprising:
  bandpass filtering the measured telemetry signal within a passband including the at least one harmonic outside the telemetry signal band and excluding the telemetry signal band; and
  bandpass filtering the measured telemetry signal within the telemetry passband prior to the combining.

40. The method as defined in claim 24 further comprising spectrally analyzing the measured telemetry signal.

41. The method as defined in claim 40 further comprising initialing a passband filter adapted to exclude components of the measured telemetry signal within the telemetry signal band, the initializing the passband filter based on an output of the spectrally analyzing.

42. The method as defined in claim 40 further comprising initializing a frequency range of a tracker used to perform the tracking the characteristic, the initializing the frequency range based on an output of the spectrally analyzing.

43. The method as defined in claim 24 wherein the transmitting comprises modulating a flow of drilling mud.

44. The method as defined in claim 43 wherein the measuring the telemetry signal comprises measuring a pressure of the drilling mud.

* * * * *